(12) United States Patent
Koh et al.

(10) Patent No.: US 12,516,110 B2
(45) Date of Patent: Jan. 6, 2026

(54) CTHRC1-SPECIFIC ANTIBODY AND USE THEREOF

(71) Applicant: PRESTIGE BIOPHARMA PTE. LTD., Singapore (KR)

(72) Inventors: Sang Seok Koh, Busan (KR); Min Kyung Kang, Busan (KR); So Yeon Park, Singapore (KR)

(73) Assignees: PRESTIGE BIOPHARMA LIMITED, Singapore (SG); PRESTIGE BIOPHARMA IDC CO., LTD., Busan (KR)

( * ) Notice: Subject to any disclaimer, the term of this patent is extended or adjusted under 35 U.S.C. 154(b) by 1016 days.

(21) Appl. No.: 17/549,809

(22) Filed: Dec. 13, 2021

(65) Prior Publication Data

US 2022/0204599 A1    Jun. 30, 2022

Related U.S. Application Data

(63) Continuation-in-part of application No. PCT/IB2020/055561, filed on Jun. 15, 2020.

(30) Foreign Application Priority Data

Jun. 13, 2019 (KR) .................. 10-2019-0070048

(51) Int. Cl.
*C07K 16/18* (2006.01)
*A61K 39/00* (2006.01)
*A61P 35/00* (2006.01)
*G01N 33/574* (2006.01)

(52) U.S. Cl.
CPC .............. *C07K 16/18* (2013.01); *A61P 35/00* (2018.01); *G01N 33/57488* (2013.01); *A61K 39/00* (2013.01); *A61K 2039/505* (2013.01); *C07K 2317/24* (2013.01); *C07K 2317/565* (2013.01); *C07K 2317/92* (2013.01); *G01N 2333/4704* (2013.01)

(58) Field of Classification Search
CPC ....... A61K 2039/505; C07K 2317/565; G01N 33/577
See application file for complete search history.

(56) References Cited

U.S. PATENT DOCUMENTS

2010/0183512 A1    7/2010  Qin et al.
2017/0355756 A1*  12/2017  Julien .................... C07K 16/18

FOREIGN PATENT DOCUMENTS

| JP | 2012506253 A | 3/2012 |
| KR | 10-2007-0030084 | 3/2007 |
| KR | 10-2011-0082669 | 7/2011 |
| KR | 10-2013-0094640 | 8/2013 |
| KR | 10-2014-0144934 | 12/2014 |
| WO | WO-2008068048 A2 * | 6/2008 ............. A61P 31/10 |
| WO | WO 2014/200134 A1 | 12/2014 |

OTHER PUBLICATIONS

KR20140144934A-Google Patents English Translation (Year: 2014).*
Mariuzza (Annu. Rev. Biophys. Biophys. Chem., 16: 139-159, 1987) (Year: 1987).*
McCarthy et al. (J. Immunol. Methods, 251(1-2): 137-149, 2001 (Year: 2001).*
Lin et al. (African Journal of Biotechnology, 10(79):18294-18302, 2011) (Year: 2011).*
Sakamoto et al (Enzyme-linked immunosorbent assay for the quantitative/qualitative analysis of plant secondary metabolites. J Nat Med. Jan. 2018;72(1):32-42. doi: 10.1007/s11418-017-1144-z. Epub Nov. 21, 2017. Erratum in: J Nat Med. Jan. 2018;72(1):43. doi: 10.1007/s11418-017-1163-9). (Year: 2017).*
Janeway et al (Immunobiology: The Immune System in Health and Disease. 5th edition. New York: Garland Science; 2001. The structure of a typical antibody molecule. Available from: https://www.ncbi.nlm.nih.gov/books/NBK27144/). (Year: 2001).*
Cui X. et al., Inhibition of CTHRC-1 by its specific monoclonal antibody attenuates cervical cancer cells metastasis, Biomedicine & Pharmacotherapy, 2019, vol. 110, pp. 758-763.
Extended European Search Report issued May 23, 2023 in connection with European Application No. 20822106.9.
Park, E. H., Collagen triple helix repeat containing-1 promotes pancreatic cancer progression by regulating migration and adhesion of tumor cells, Carcinogenesis, vol. 00, No. 00, (2013) pp. 1-9.
Lee, J. et al., CTHRC1 promotes angiogenesis by recruiting Tie2-expressing monocytes to pancreatic tumors, Experimental & Molecular Medicine, vol. 48, No. e261, (2016) pp. 1-11.
Korea Research Institute of Bioscience And Biotechnology, Mechanistic Studies and Antibody Therapeutic Application of CTHRC1, A Novel Factor Expressed in Cancer Cells. Government Project Report) (2013) pp. 1-60.
International Search Report issued Nov. 3, 2020 in connection with PCT International Application No. PCT/IB2020/055561.
Derksen, P.W. et al., "Illegitimate WNT signaling promotes proliferation of multiple myeloma cells", Proceedings of the National Academy of Sciences, 2004, vol. 101, No. 16, pp. 6122-6127.
Dirks, P.B., "Brain Tumor Stem Cells: Bringing Order to the Chaos of Brain Cancer", Journal of Clinical Oncology, 2008, vol. 26. No. 17, pp. 2916-2924.
López-Lázaro, M., "The migration ability of stem cells can explain the existence of unknown primary site. Rethinking metastasis.", Oncoscience, 2015, vol. 2, No. 5, pp. 467.
Ohno, S. et al., "Antigen-binding specificities of antibodies are primarily determined by seven residues of $V_H$", Proceedings of the National Academy of Sciences, 1985, vol. 82, No. 9, pp. 2945-2949.
Tran, B. and Rosenthal M.A., "Survival comparison between glioblastoma multiforme and other incurable cancers", Journal of Clinical Neuroscience, 2010, vol. 17, pp. 417-421.
Dec. 19, 2023 Office Action issued in connection with Russian Application No. 2021137558/10.

* cited by examiner

*Primary Examiner* — Gregory S Emch
*Assistant Examiner* — Ashley H. Gao
(74) *Attorney, Agent, or Firm* — Gary J. Gershik

(57) ABSTRACT

The present invention relates to a novel antibody which binds to CTHRC1 and use thereof.

16 Claims, 30 Drawing Sheets

Specification includes a Sequence Listing.

[Fig. 1]
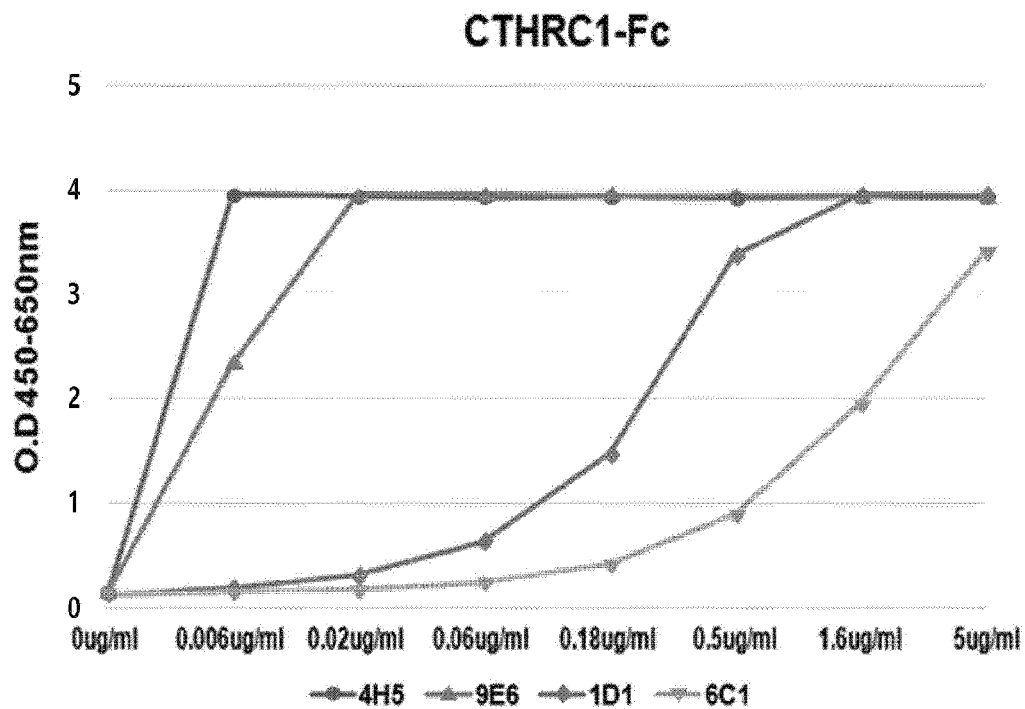
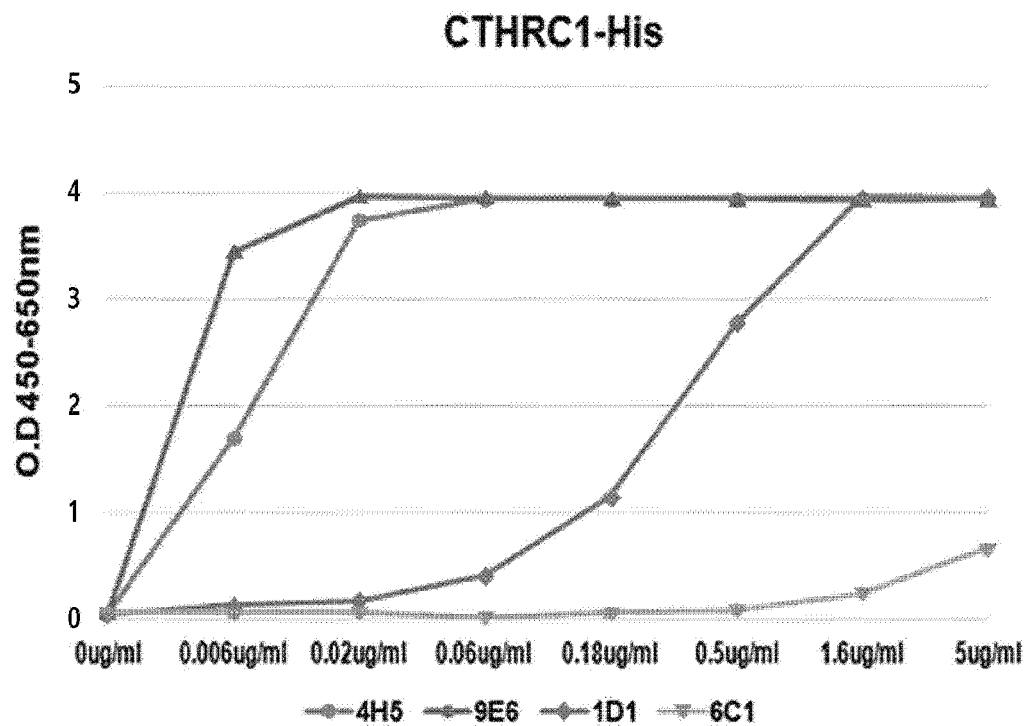

[Fig. 2]
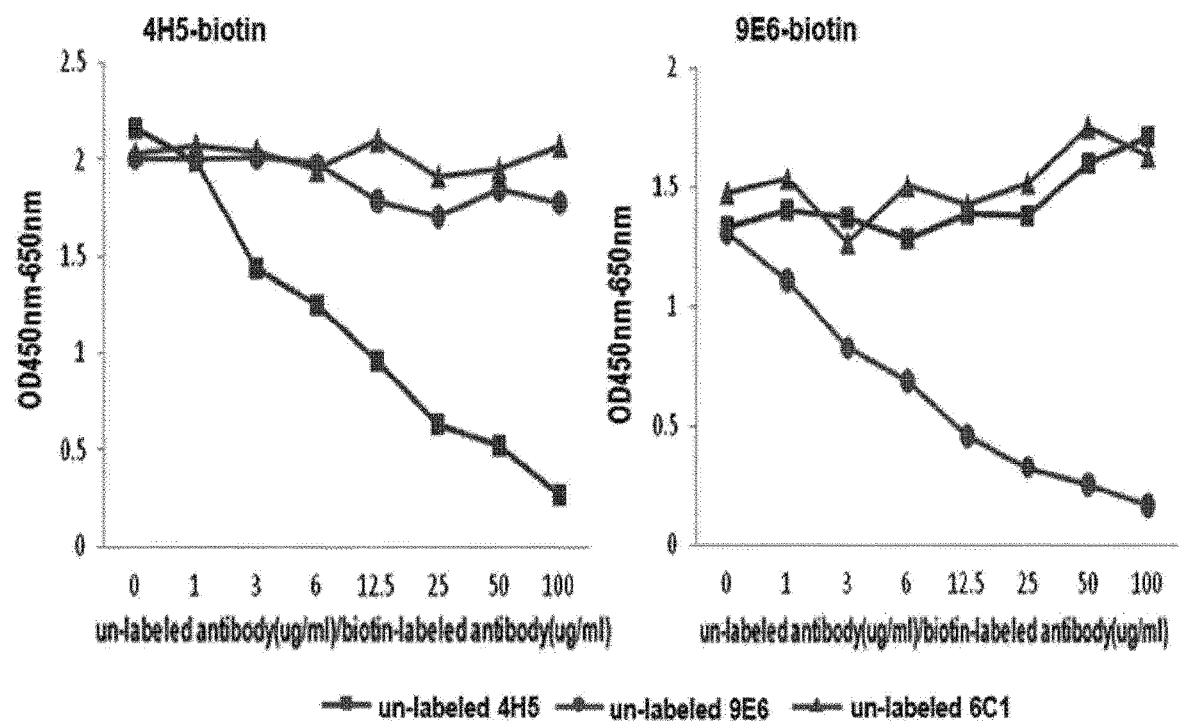

[Fig. 3]
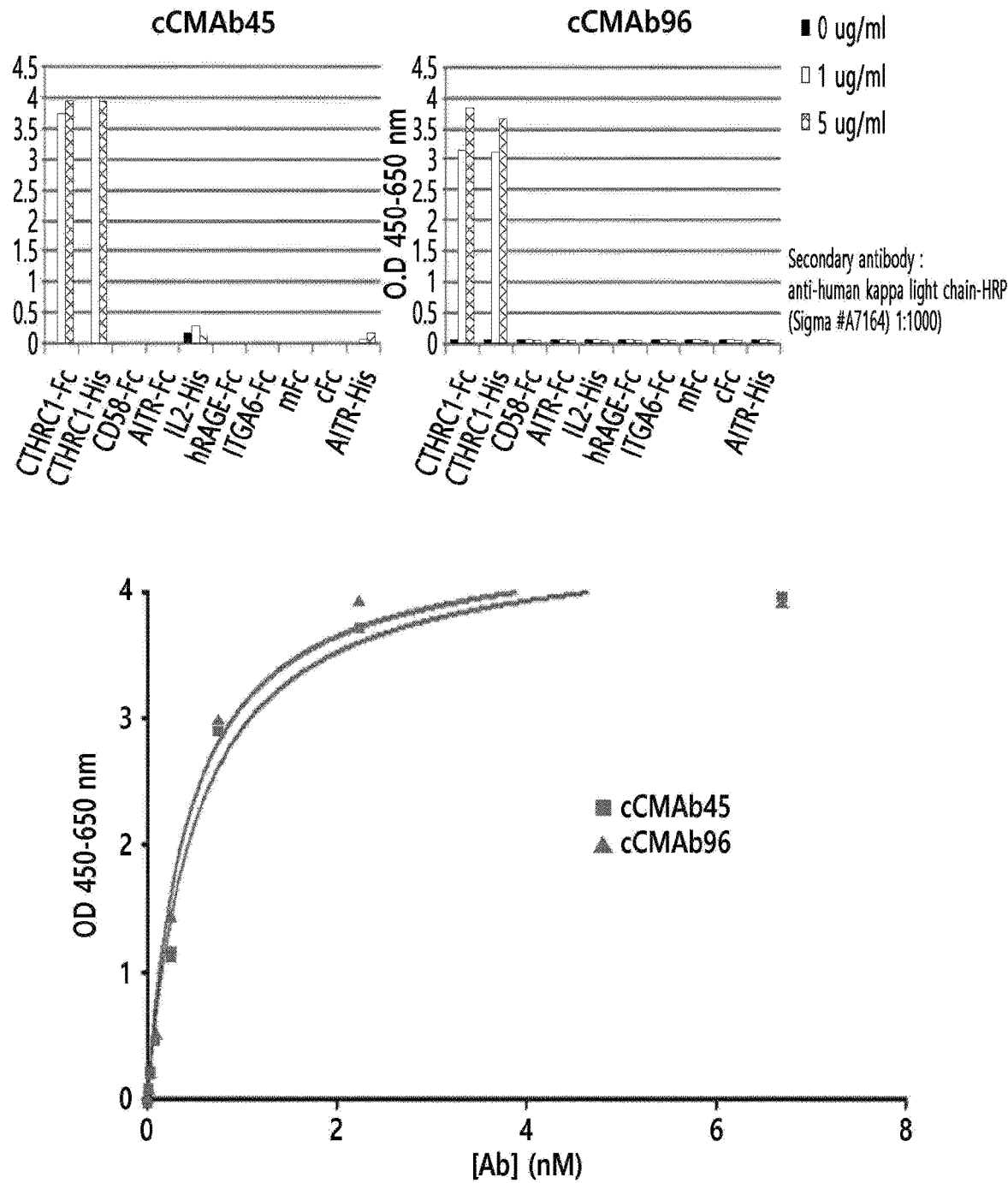

[Fig. 4]
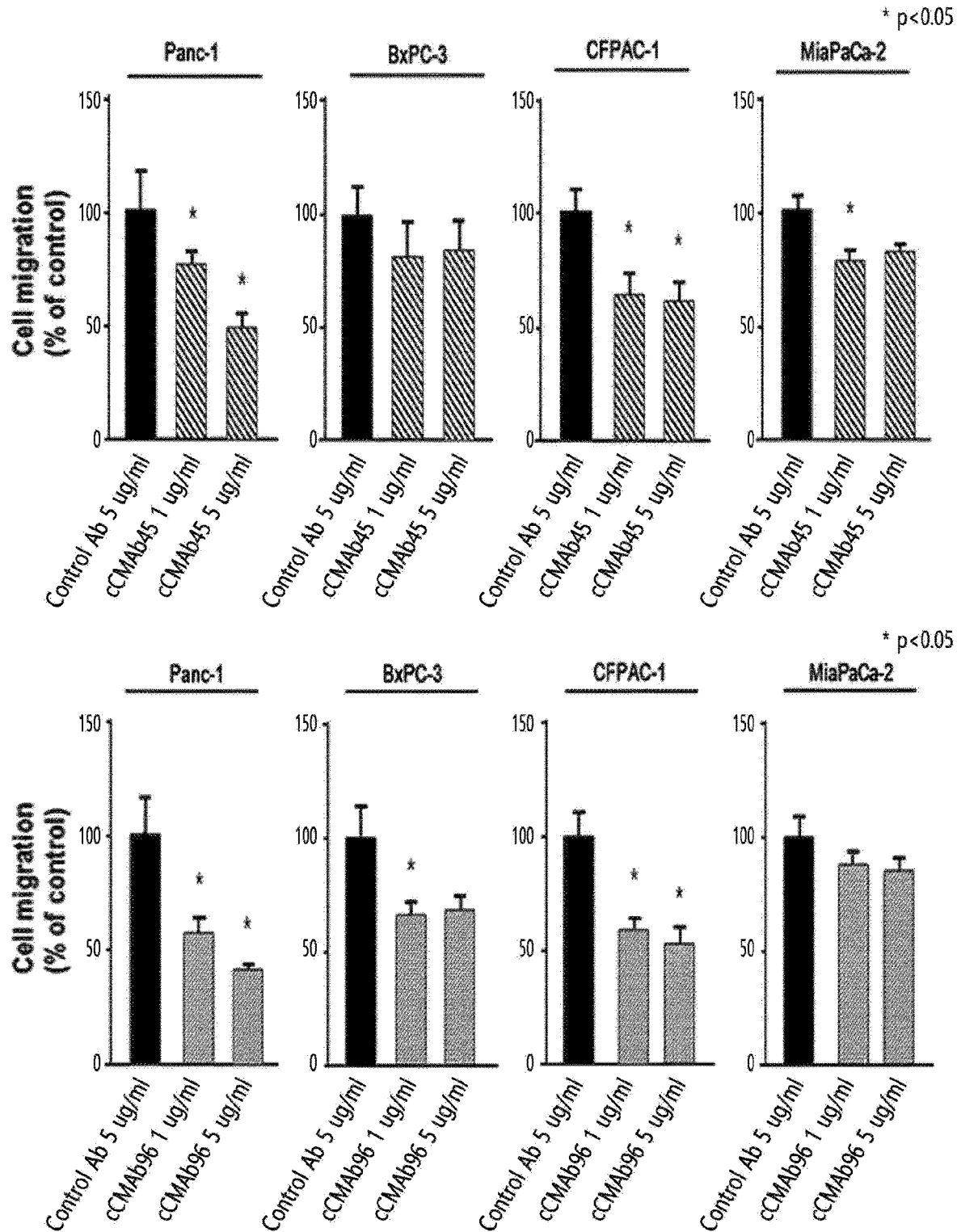

[Fig. 5]
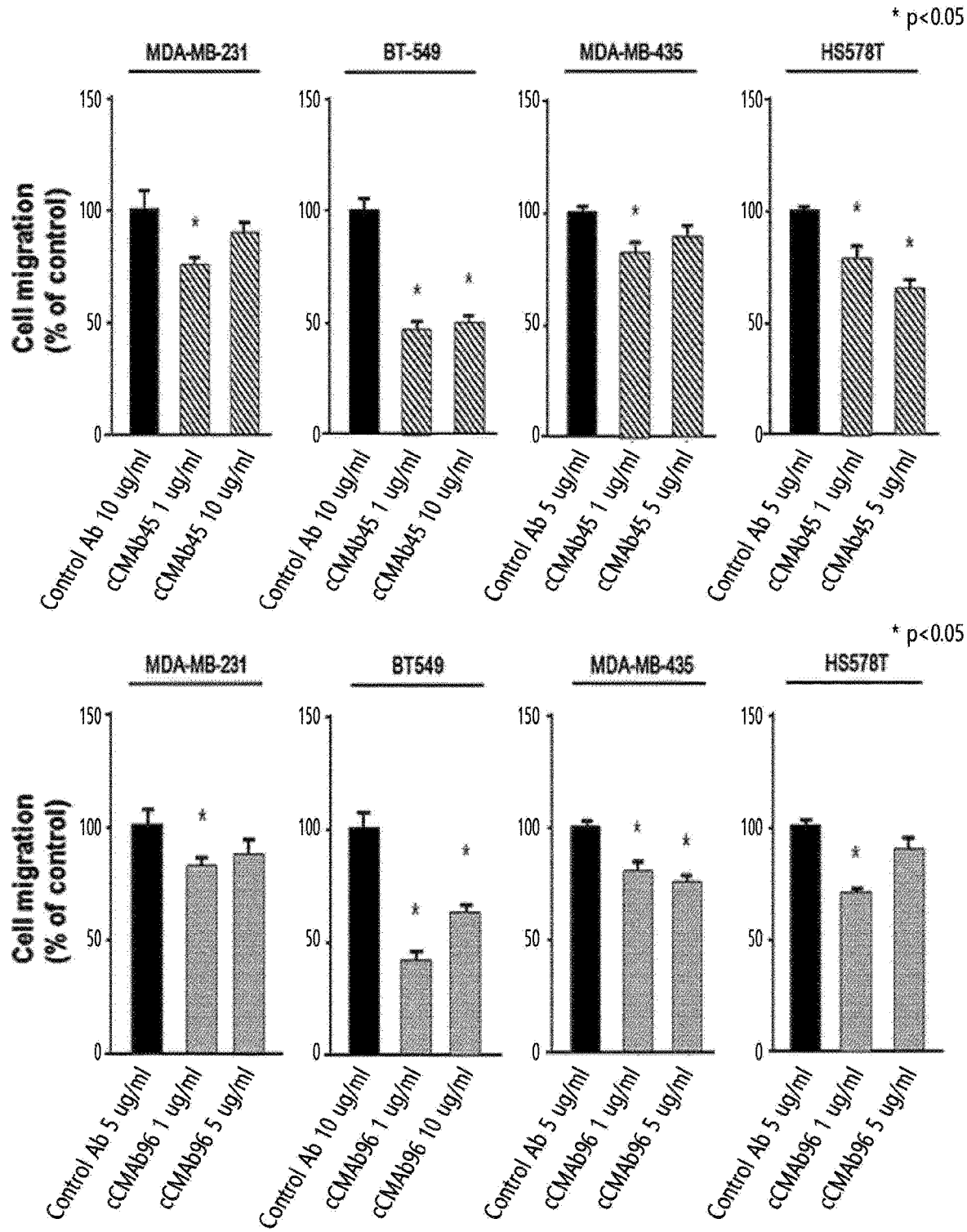

[Fig. 6]
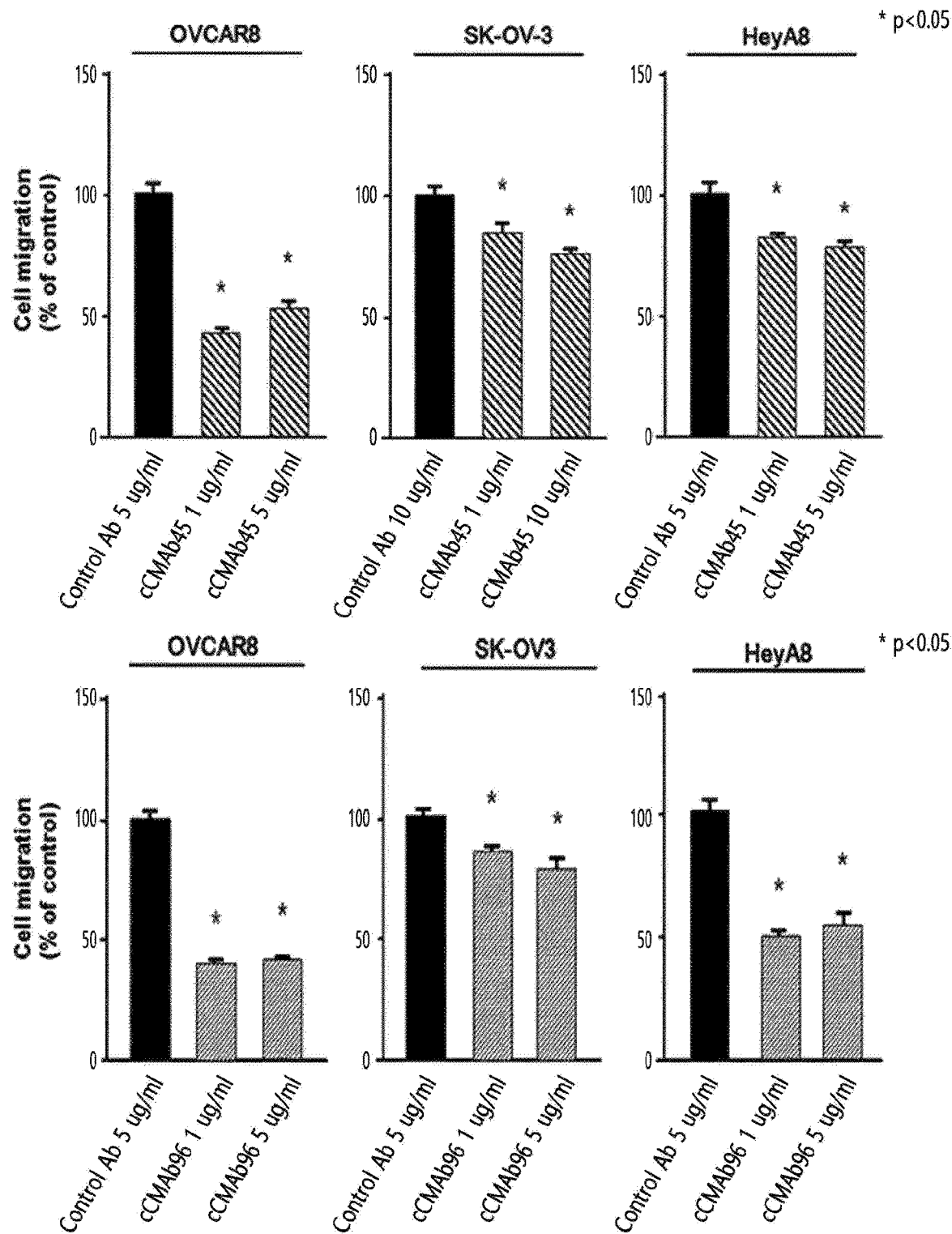

[Fig. 7]
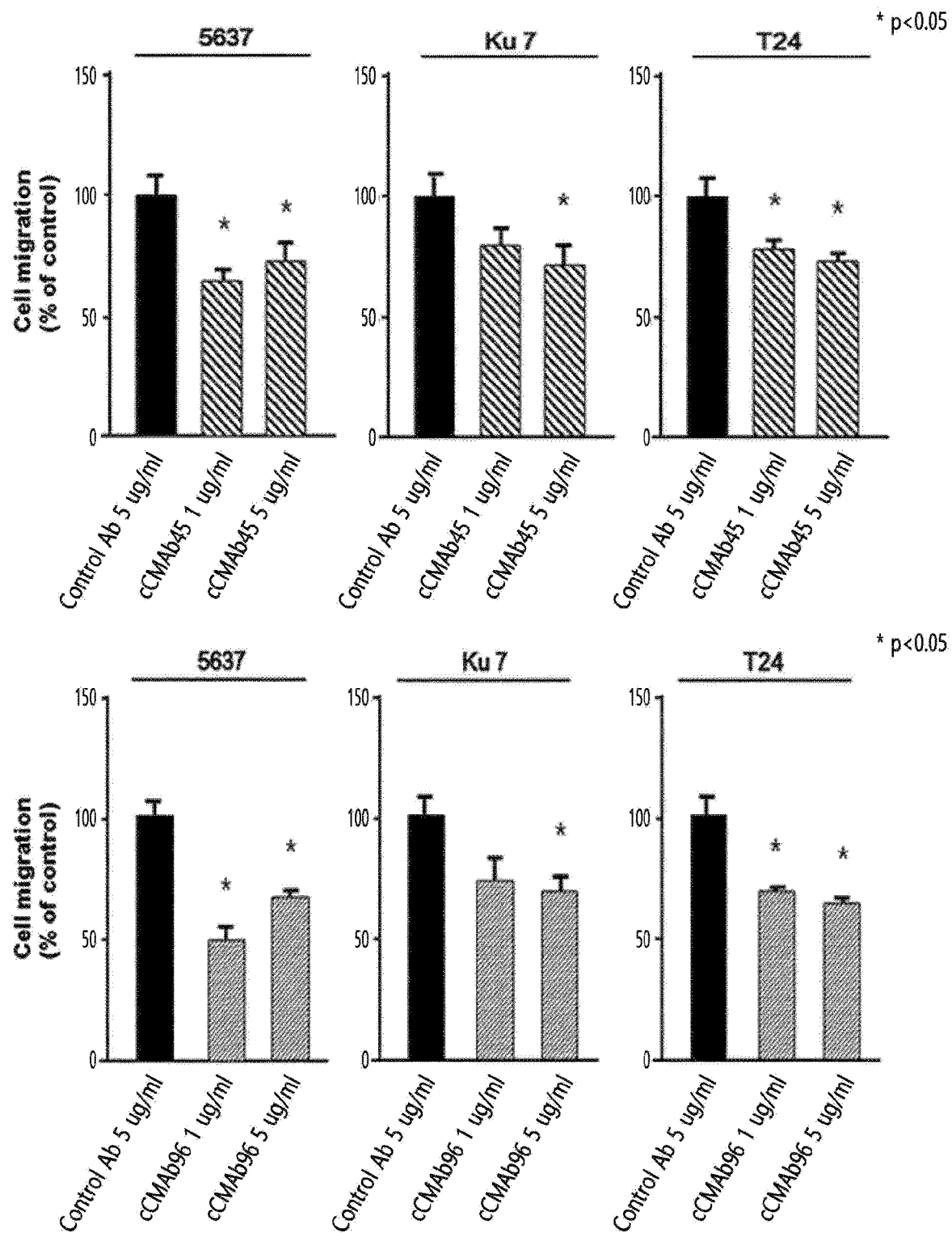

[Fig. 8]
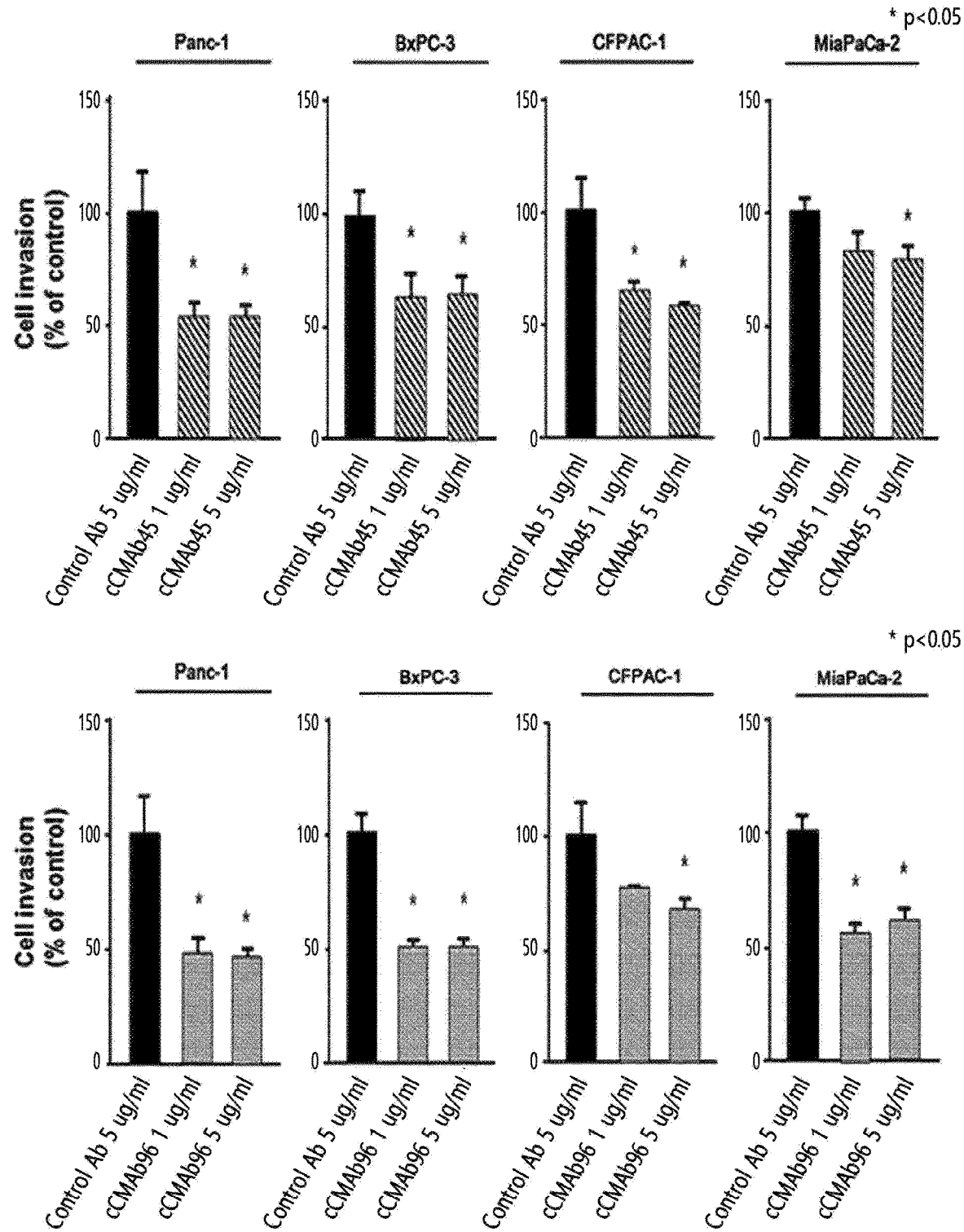

[Fig. 9]
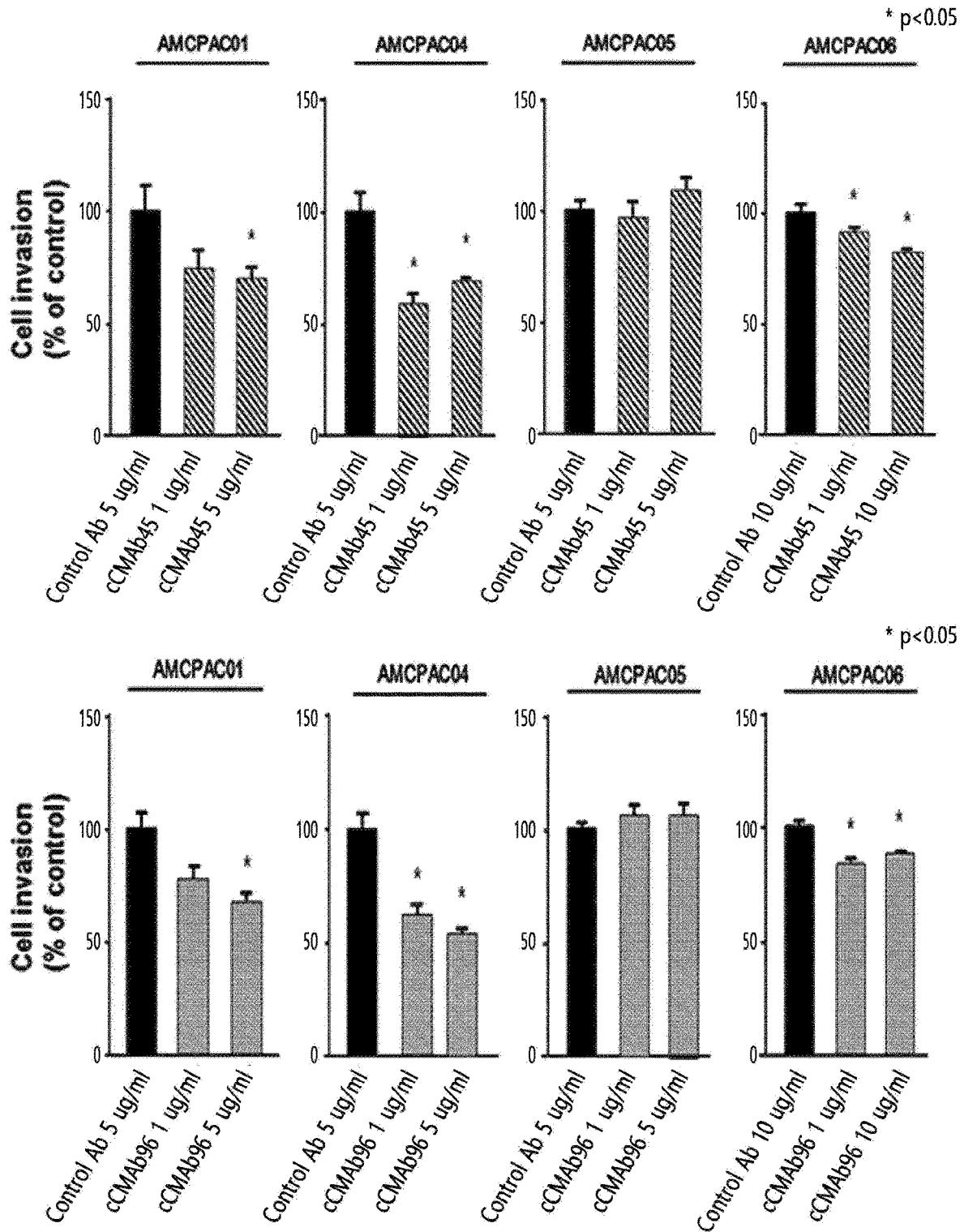

[Fig. 10]
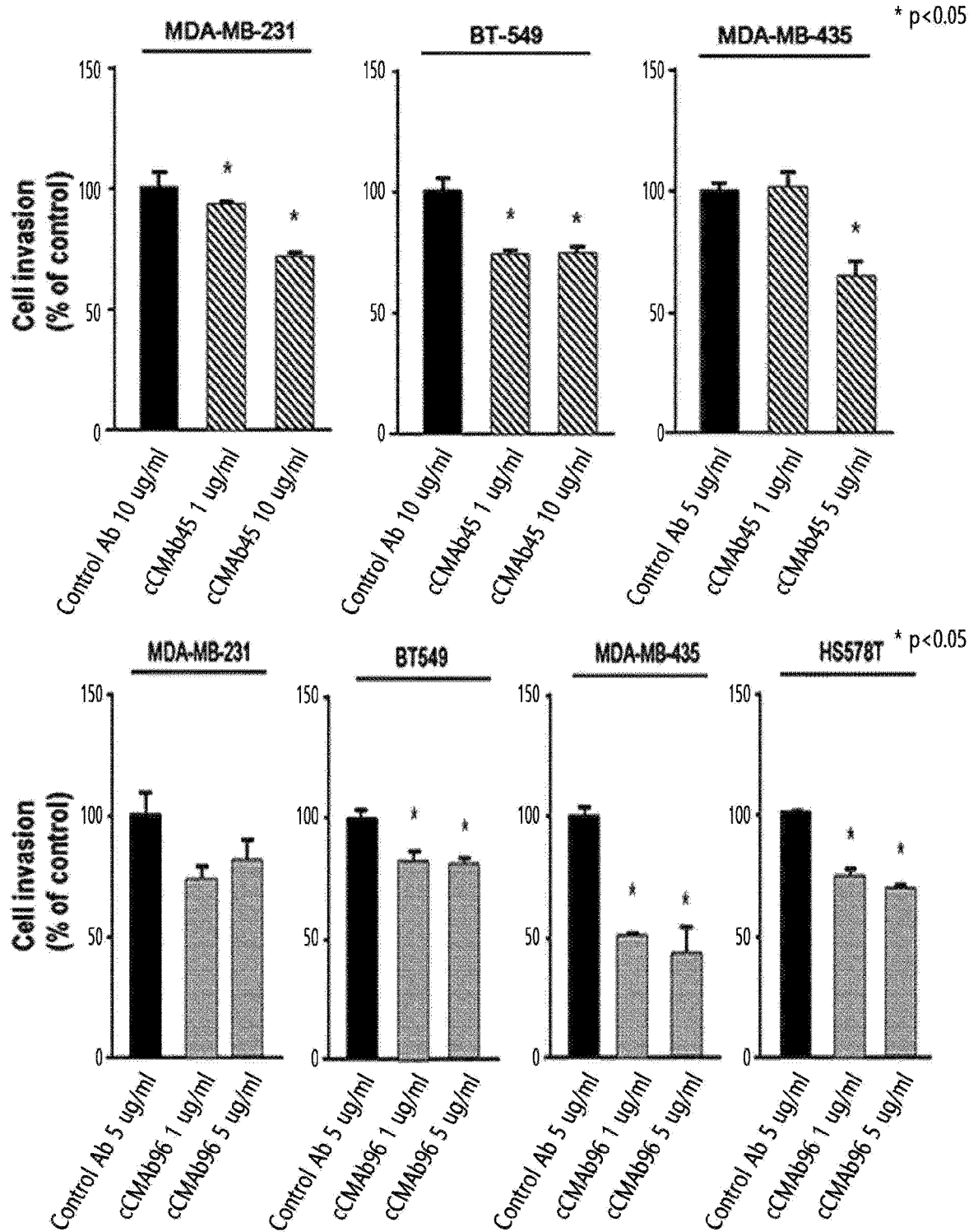

[Fig. 11]
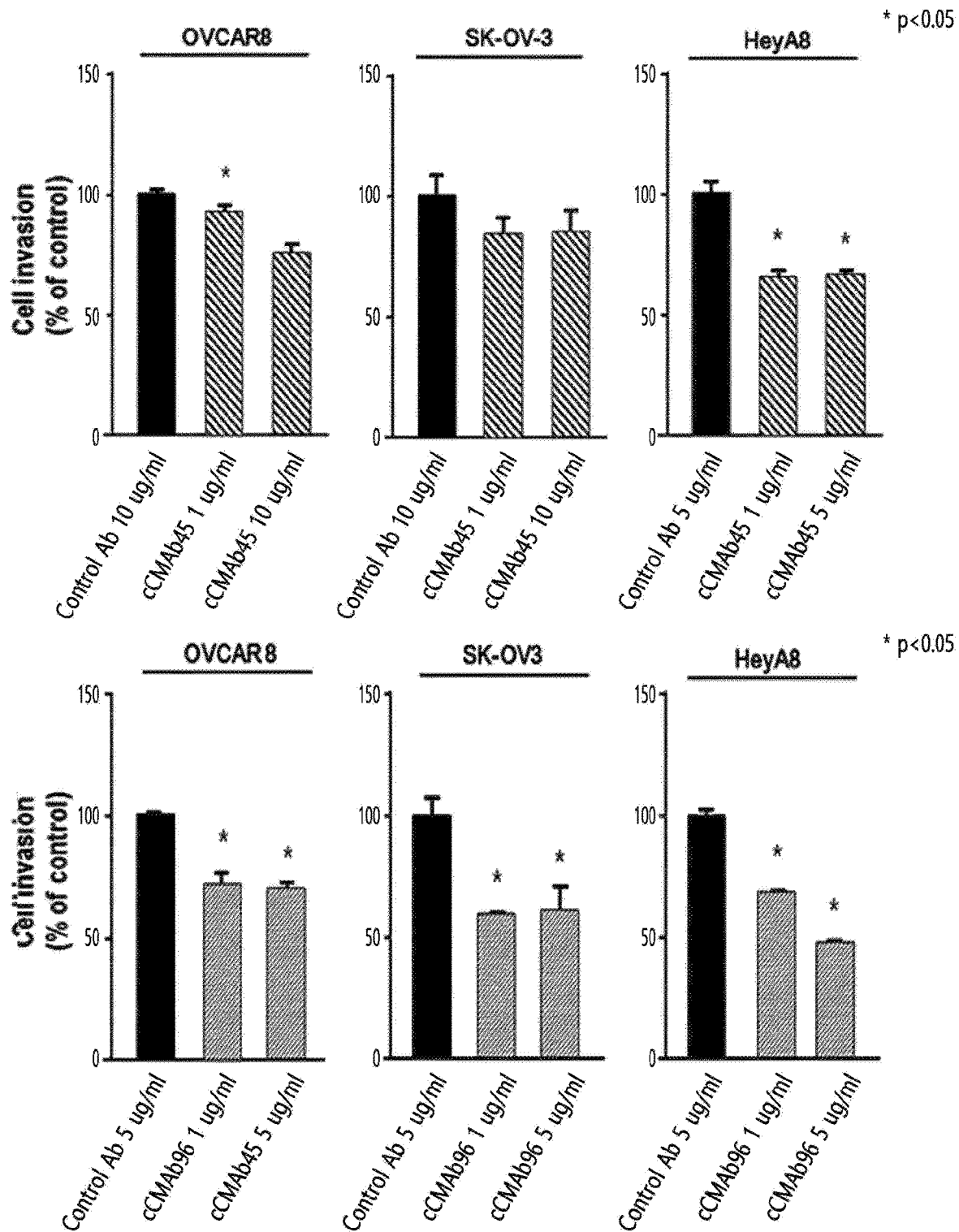

[Fig. 12]
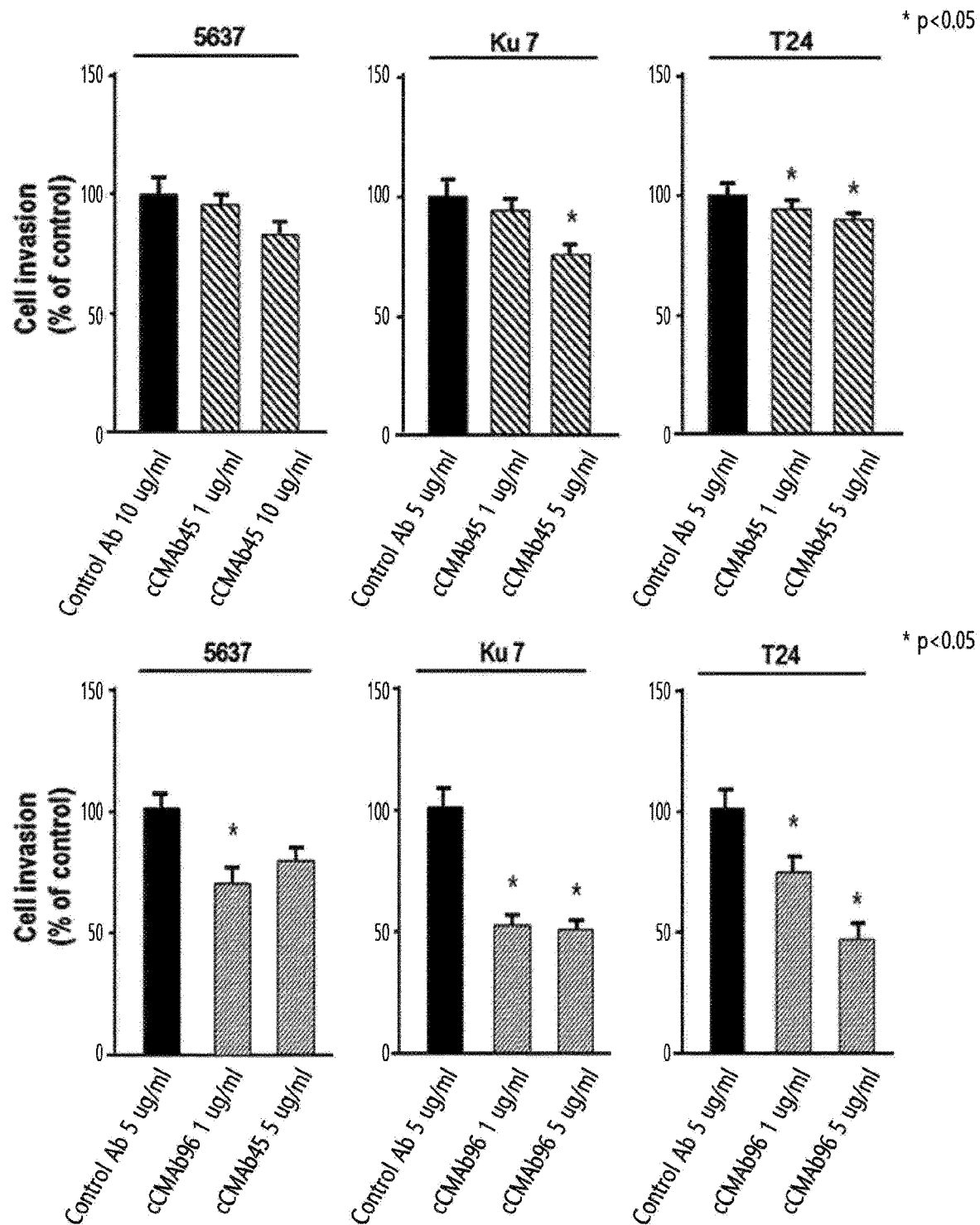

[Fig. 13]
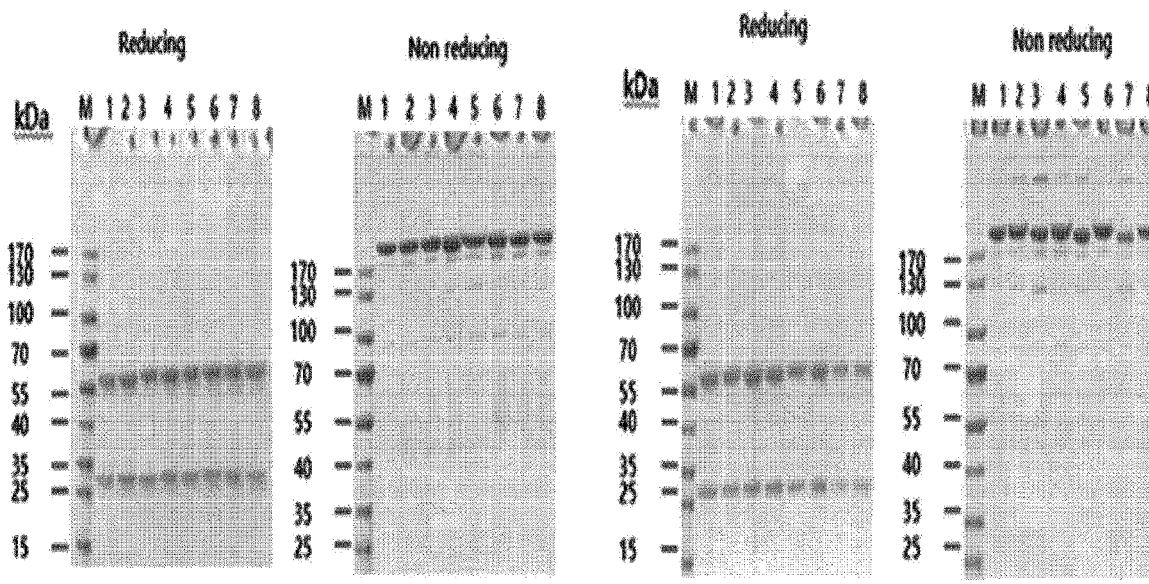

[Fig. 14]
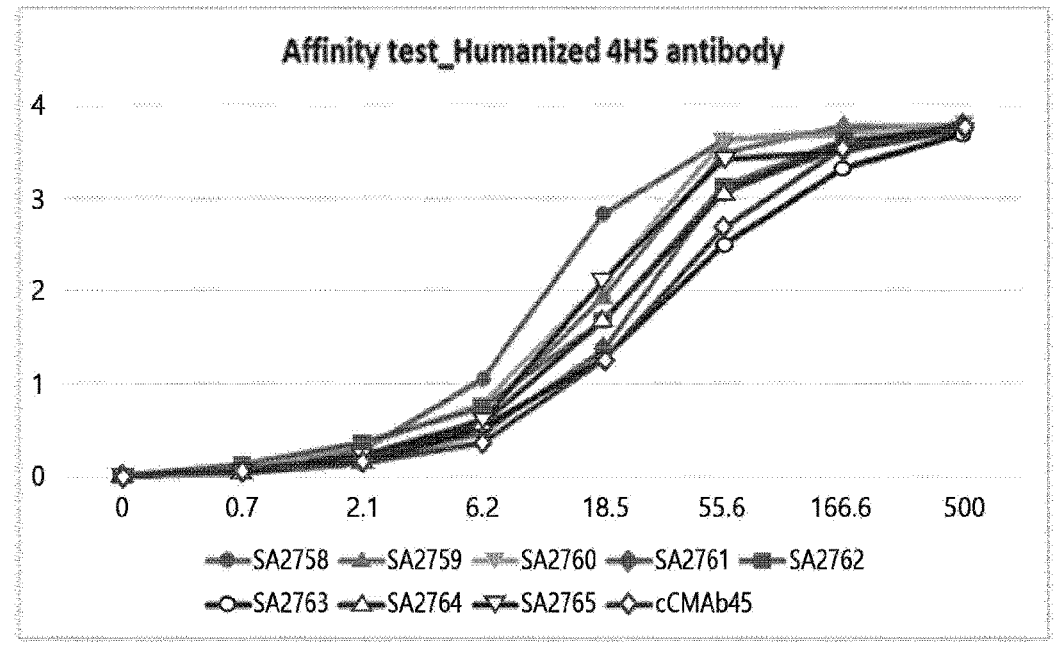
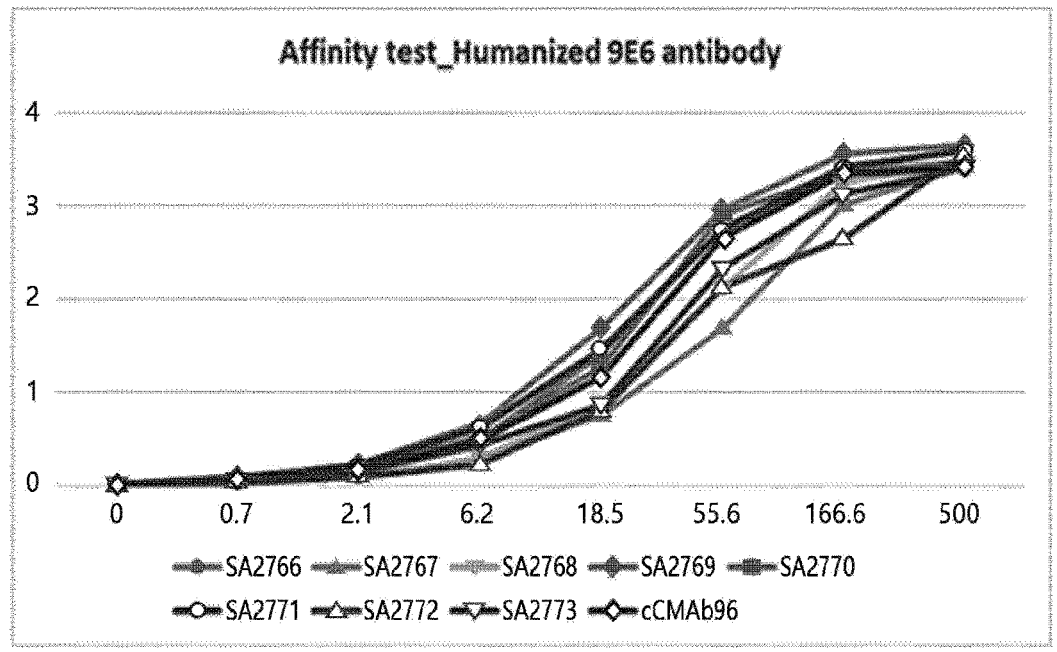

[Fig. 15]
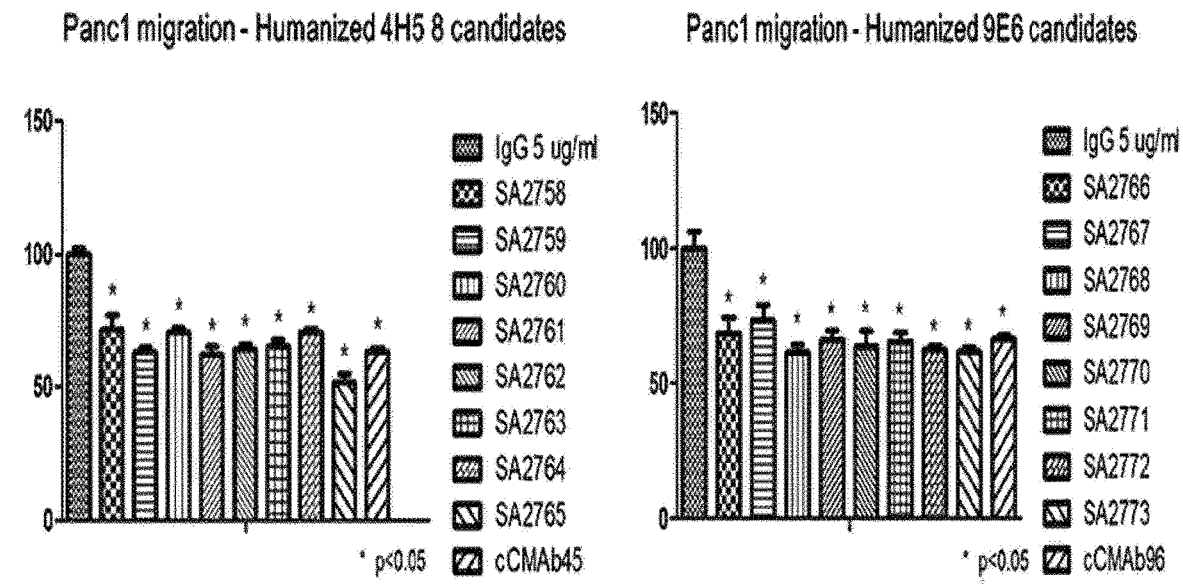
[Fig. 16]
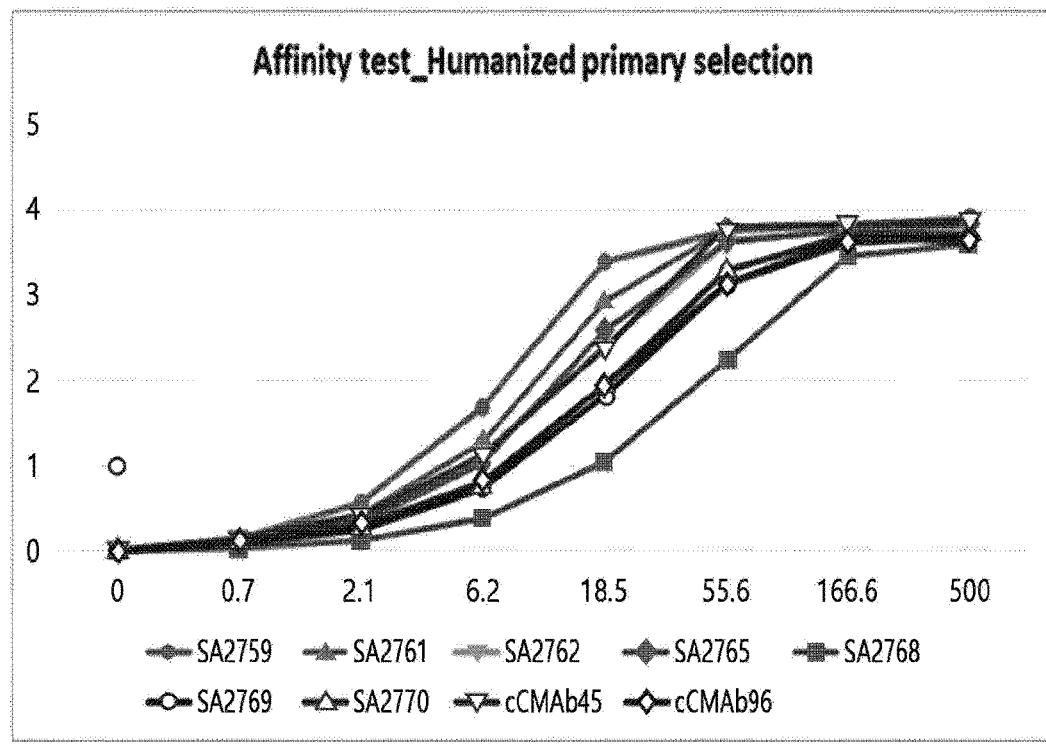

[Fig. 17]
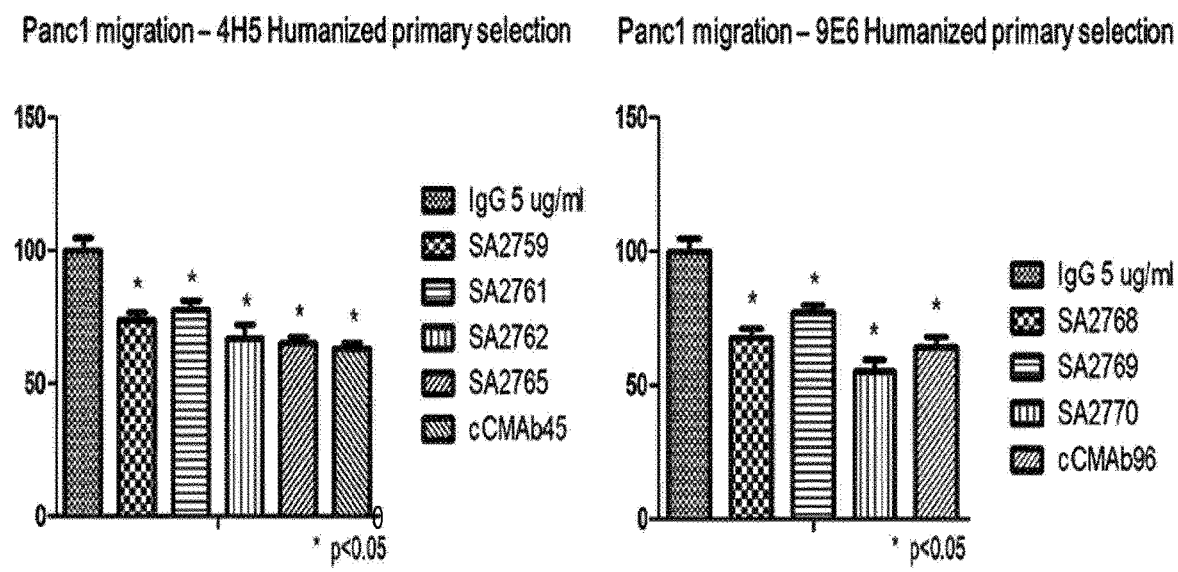

[Fig. 18]
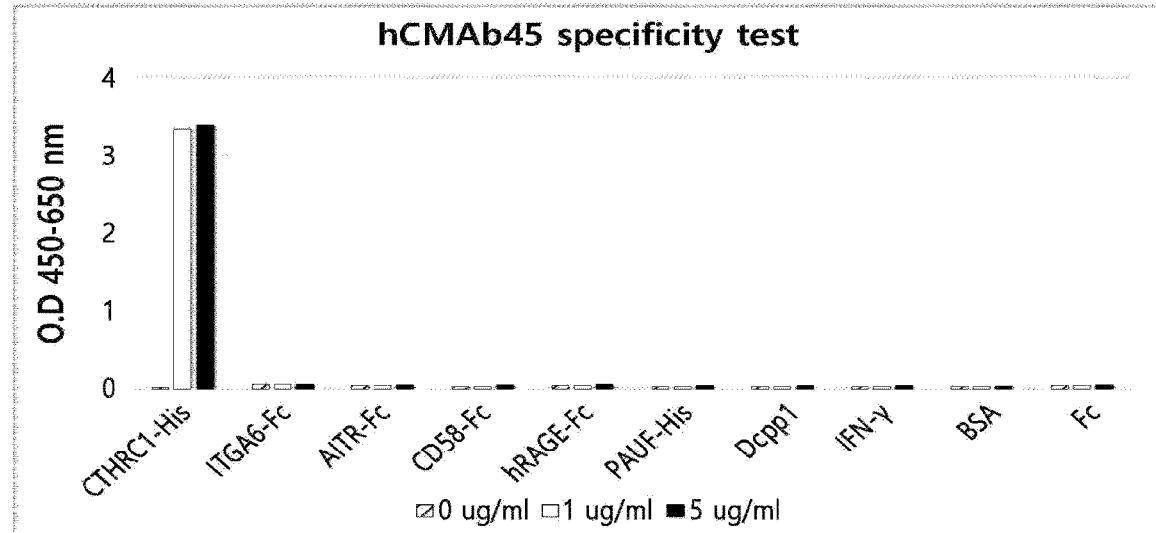
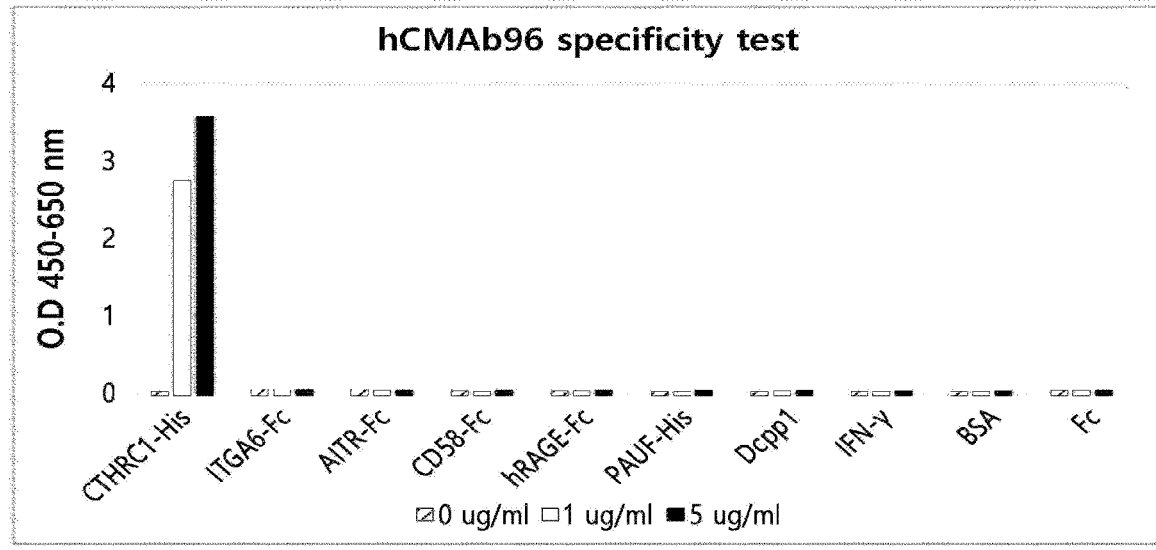
| hCMAb45 450-650nm | CTHRC1-His | ITGA6-Fc | AITR-Fc | CD58-Fc | hRAGE-Fc | PAUF-His | Dcpp1 | IFN-γ | BSA | Fc |
|---|---|---|---|---|---|---|---|---|---|---|
| 0ug/ml | 0.0064 | 0.0397 | 0.0323 | 0.0192 | 0.0239 | 0.0135 | 0.0066 | 0.0091 | 0.0087 | 0.0363 |
| 1ug/ml | 3.3369 | 0.0386 | 0.0296 | 0.0189 | 0.024 | 0.0111 | 0.0082 | 0.0077 | 0.0089 | 0.0273 |
| 5ug/ml | 3.3784 | 0.0431 | 0.0341 | 0.0234 | 0.0287 | 0.0112 | 0.0068 | 0.0083 | 0.0085 | 0.0286 |
| hCMAb96 450-650nm | CTHRC1-His | ITGA6-Fc | AITR-Fc | CD58-Fc | hRAGE-Fc | PAUF-His | Dcpp1 | IFN-γ | BSA | Fc |
|---|---|---|---|---|---|---|---|---|---|---|
| 0ug/ml | 0.0074 | 0.0398 | 0.0381 | 0.0241 | 0.0257 | 0.0118 | 0.0073 | 0.0074 | 0.008 | 0.0281 |
| 1ug/ml | 2.755 | 0.0371 | 0.0317 | 0.0217 | 0.0238 | 0.0104 | 0.0078 | 0.0075 | 0.0073 | 0.0261 |
| 5ug/ml | 3.5633 | 0.0436 | 0.0352 | 0.0275 | 0.0298 | 0.0107 | 0.0079 | 0.0073 | 0.0074 | 0.0325 |

[Fig. 19a]
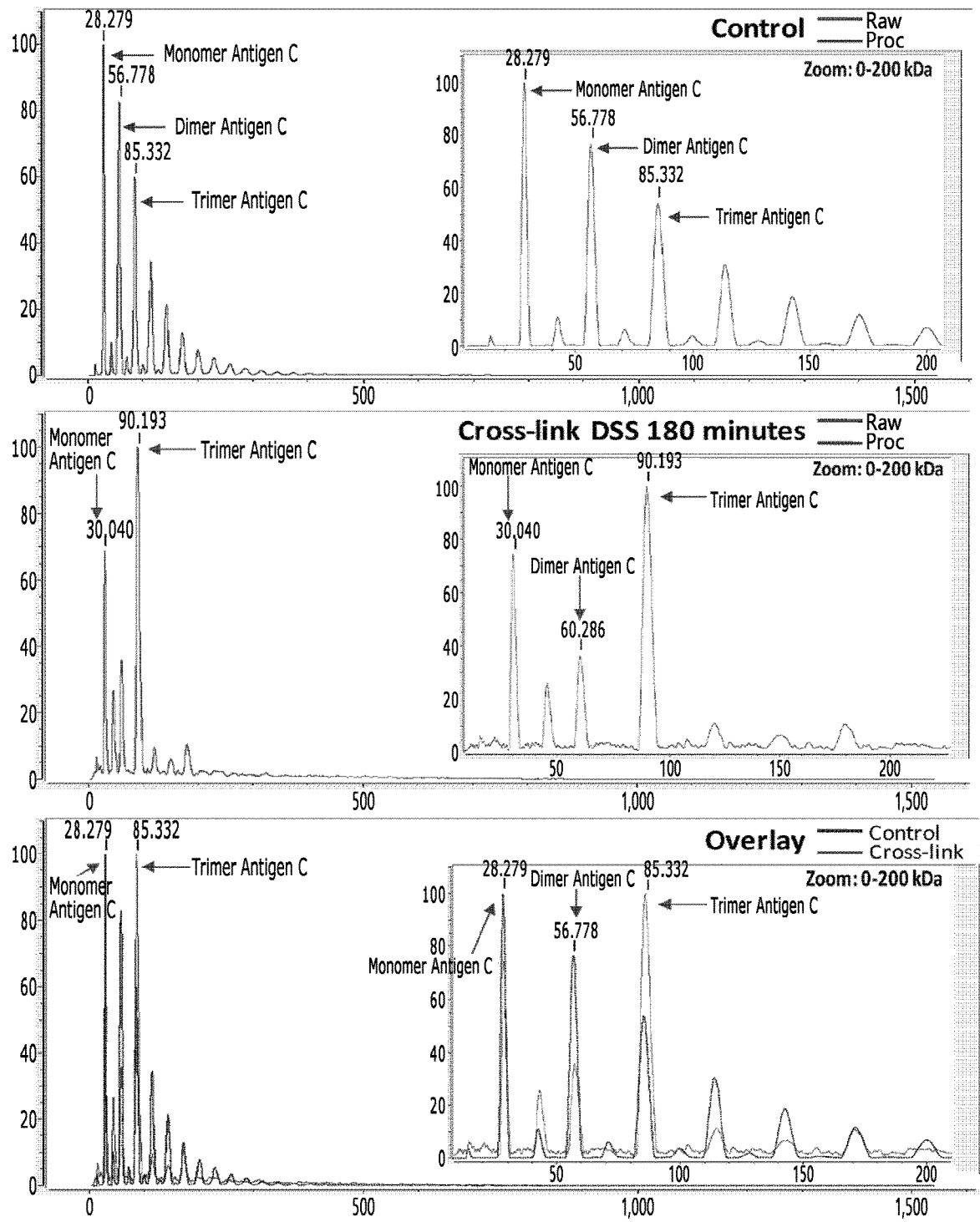

[Fig. 19b]
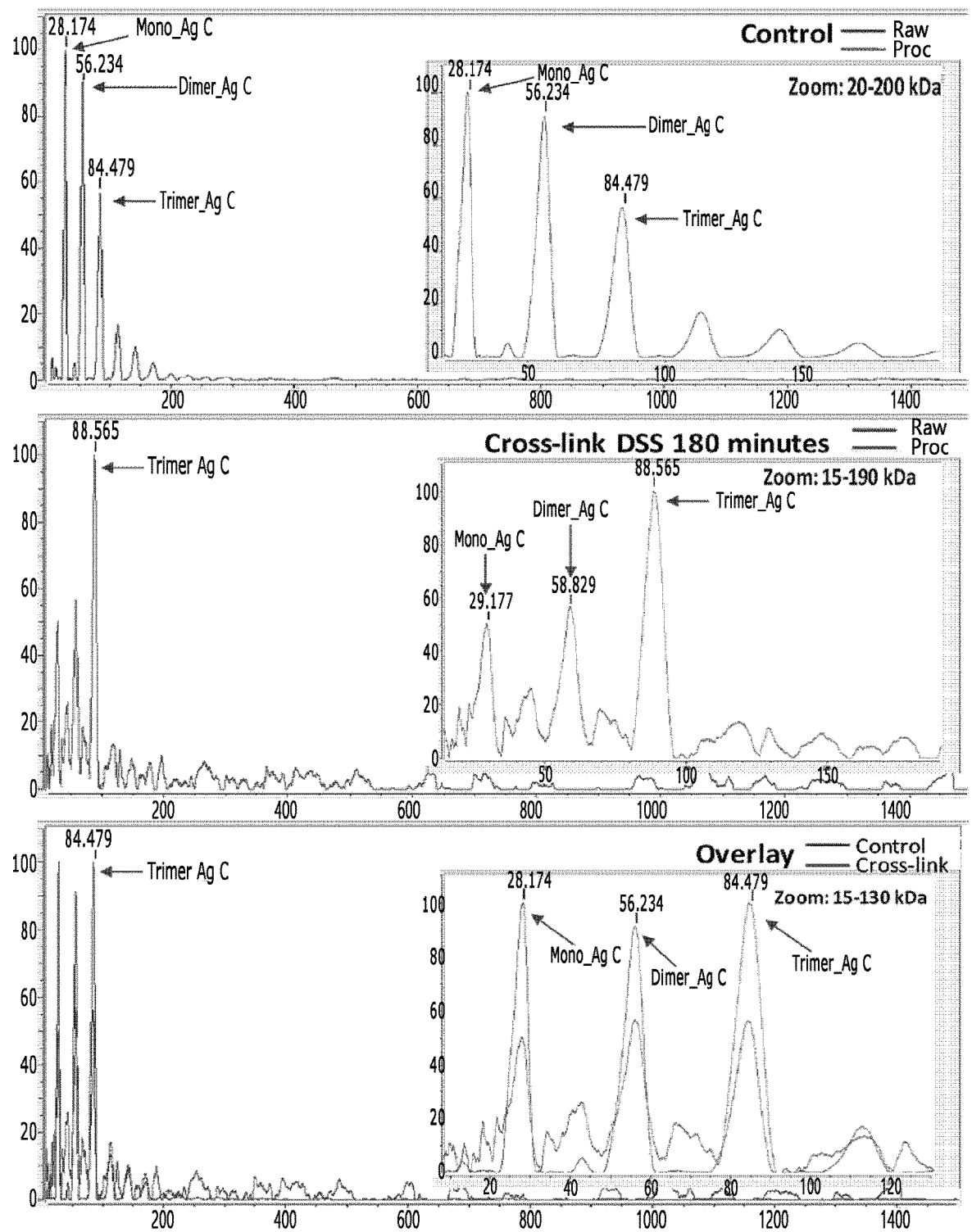

[Fig. 20a]
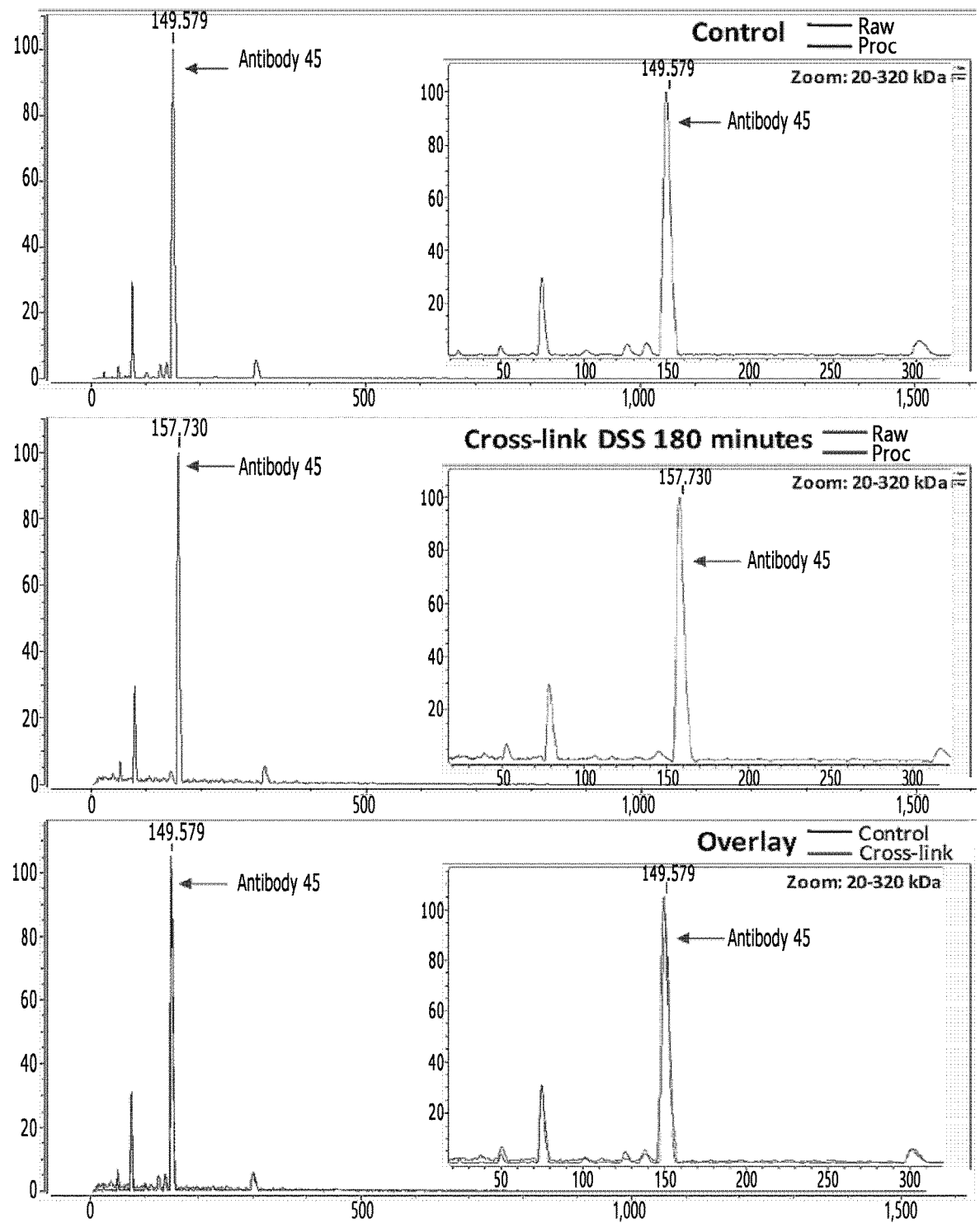

[Fig. 20b]
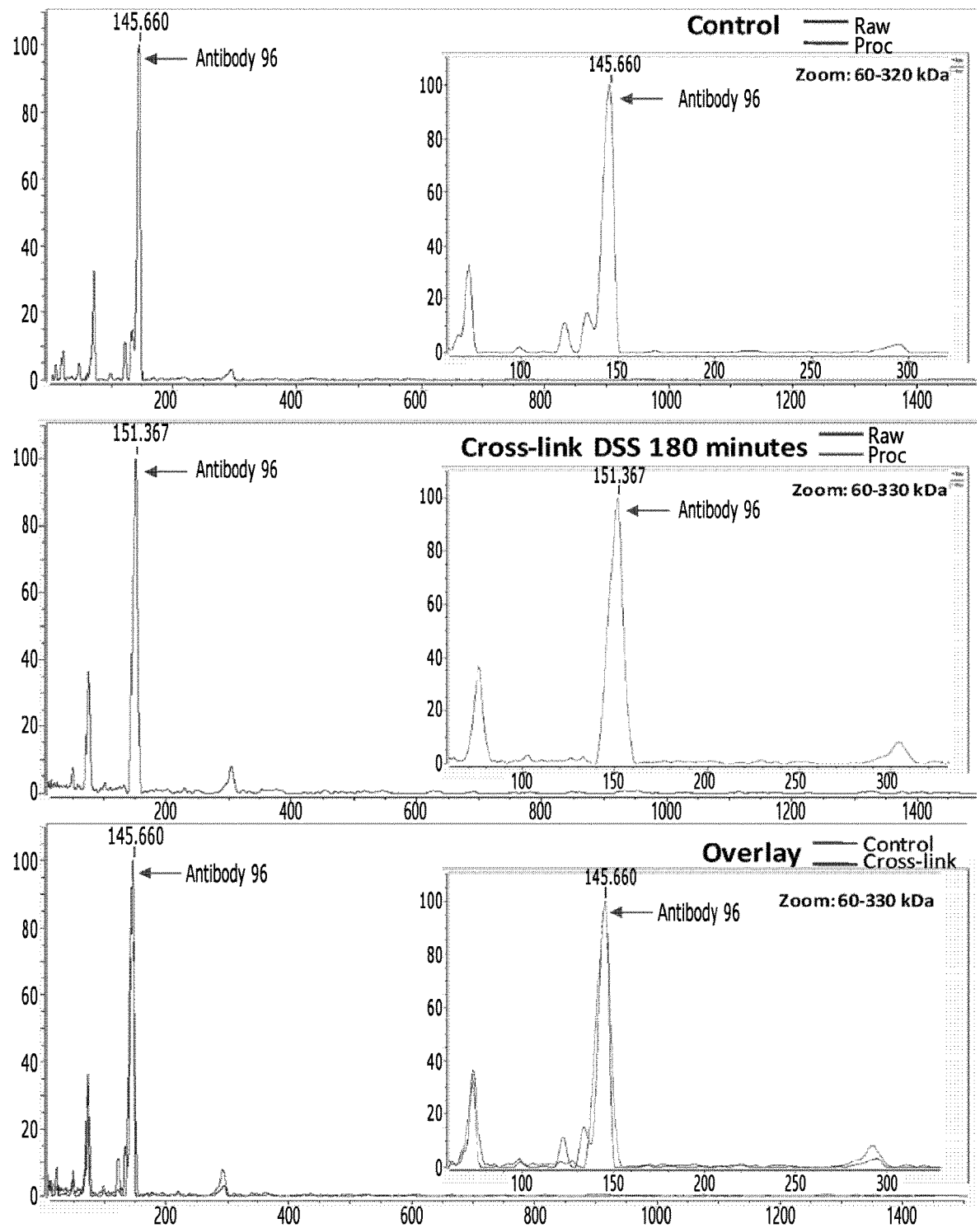

[Fig. 21a]
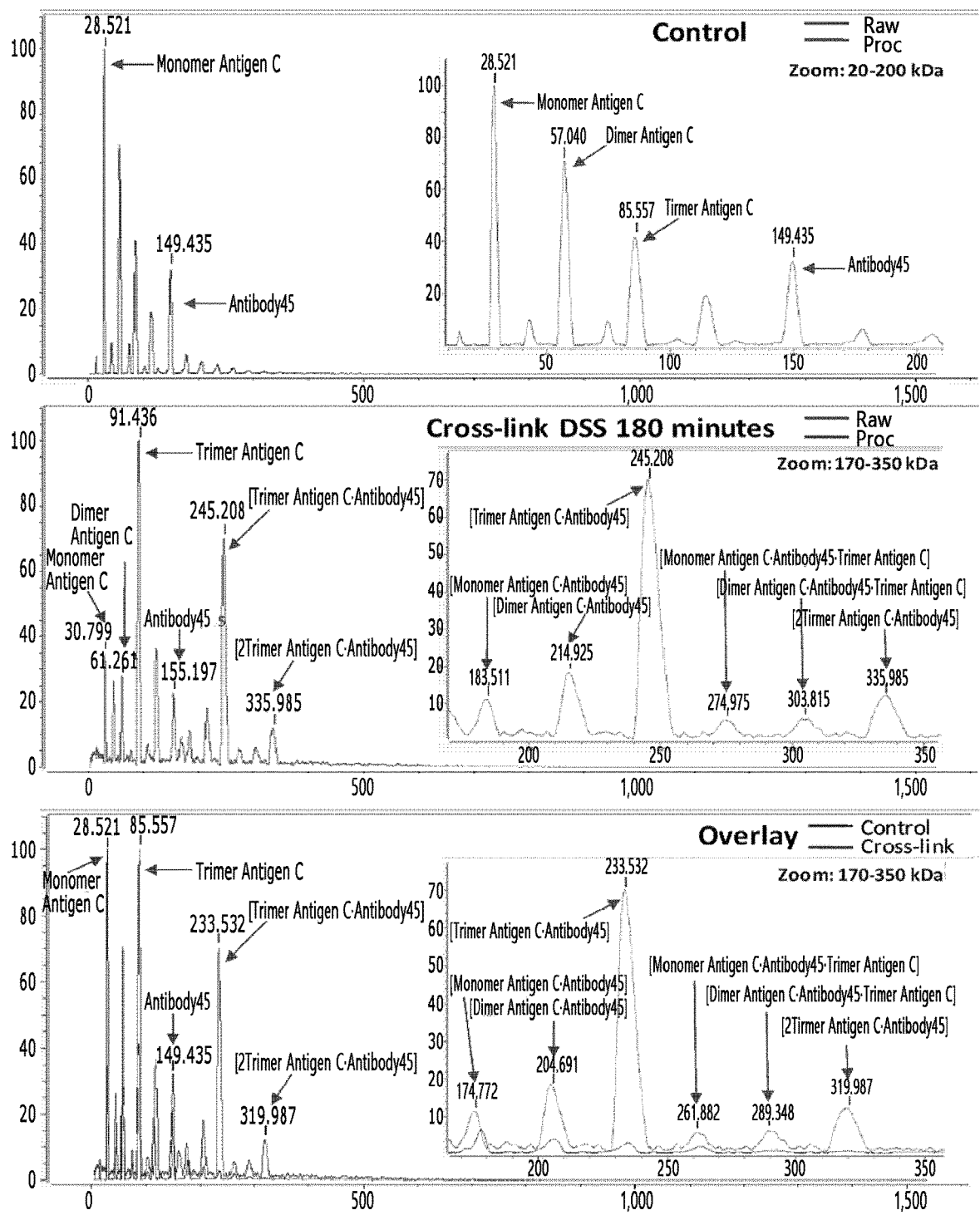

[Fig. 21b]
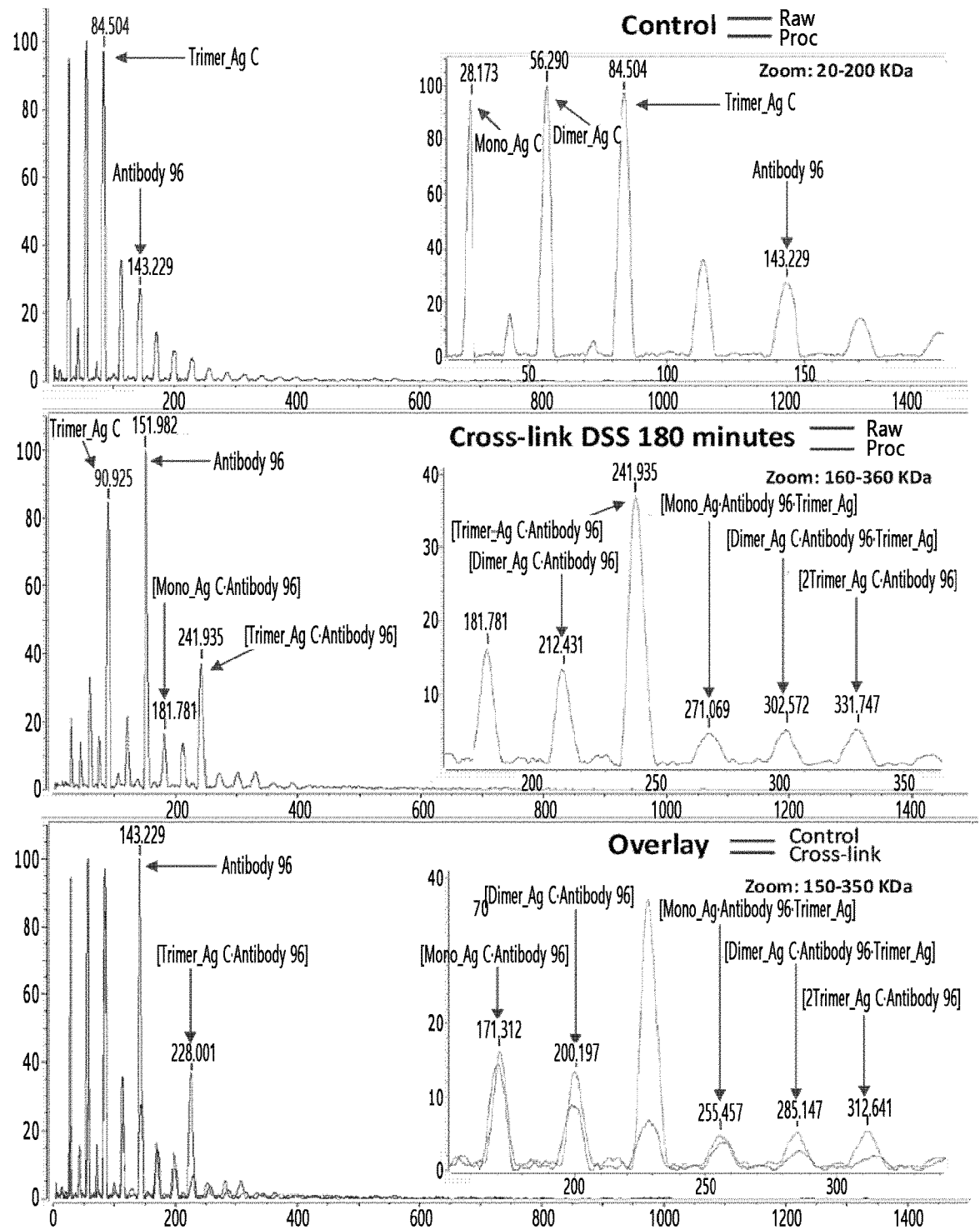

[Fig. 22]

| No. | Sequence | Enzyme | Antibody | Antigen | Seqeunce of hCMAb45 | Sequence of CTHRC1 |
|---|---|---|---|---|---|---|
| 1 | AINPYYGST-ANGIPGTPGIPGRDGFKGEKGECLRES-a5-b13 | Thermolysin | hMCAb45 HC | CTHRC1 | 50-58 | 41-67 |
| 2 | MDYWGQG-RDGFKGEKG-a3-b5 | Elastase | hMCAb45 HC | CTHRC1 | 108-114 | 53-61 |
| 3 | SLPVTPGEPASISCRSSKSL-KGEKGECLRESF-a19-b9 | Chymotrypsin | hMCAb45 LC | CTHRC1 | 10-29 | 57-68 |
| 4 | RSEDTAVYYCARSGY-KGEKGECLRESFEESW-a12-b9 | Chymotrypsin | hMCAb45 HC | CTHRC1 | 87-101 | 57-72 |
| 5 | EWMGAINPYYGSTVYGQKFQGRLTITA-ECLRESF-a10-b4 | AspN | hMCAb45 HC | CTHRC1 | 46-72 | 62-68 |
| 6 | EWMGAINPYYGSTVYGQKFQGRLTITA-ECLRESF-a12-b4 | AspN | hMCAb45 HC | CTHRC1 | 46-72 | 62-68 |
| 7 | AMDYWG-EKGECLRES-a4-b7 | Elastase | hMCAb45 HC | CTHRC1 | 107-112 | 59-67 |
| 8 | GSTVY-GKIAECTFTKMRSNSALRVL-a3-b9 | Chymotrypsin | hMCAb45 HC | CTHRC1 | 56-60 | 91-110 |
| 9 | YCARSGY-TKMRSNSALRVL-a4-b5 | Chymotrypsin | hMCAb45 HC | CTHRC1 | 95-101 | 99-110 |
| 10 | VSCKASGYSFTDYIILWVR-MRSNSALR-a9-b5 | Trypsin | hMCAb45 HC | CTHRC1 | 20-38 | 101-108 |
| 11 | YCARSGY-TKMRSNSALRVL-a4-b7 | Chymotrypsin | hMCAb45 HC | CTHRC1 | 95-101 | 99-110 |
| 12 | CARSGYGY-DQGSPEMNSTINIHRTSSVEGLCEGIGAGL-a4-b9 | Chymotrypsin | hMCAb45 HC | CTHRC1 | 96-103 | 149-178 |
| 13 | IYLVSNRF-LDQGSPEMNSTINIHRTSSVEGL-a5-b11 | Chymotrypsin | hMCAb45 LC | CTHRC1 | 53-60 | 148-170 |
| 14 | LPLTFGQGTKL-DQGSPEMNSTINIHRTSSVEGL-a4-b10 | Chymotrypsin | hMCAb45 LC | CTHRC1 | 99-109 | 149-170 |
| 15 | YYCFQSNYLPLTFG-NIHRTS-a6-b3 | Elastase | hMCAb45 LC | CTHRC1 | 91-104 | 160-165 |

| No. | Sequence | Enzyme | Antibody | Antigen | Seqeunce of hCMAb96 | Sequence of CTHRC1 |
|---|---|---|---|---|---|---|
| 1 | QSYPL-ECLRESFEES-a2-b4 | Elastase | hMCAb96 LC | CTHRC1 | 92-96 | 62-71 |
| 2 | QSYPL-ECLRESFEES-a3-b4 | Elastase | hMCAb96 LC | CTHRC1 | 92-96 | 62-71 |
| 3 | QSYPL-ECLRESFEES-a2-b6 | Elastase | hMCAb96 LC | CTHRC1 | 92-96 | 62-71 |
| 4 | ASGYTFTSYWMHWVR-ESFEESWTPNYK-a7-b6 | Trypsin | hCMAb96 HC | CTHRC1 | 24-38 | 66-77 |
| 5 | LLIYKASNLHSGVPSR-GECLRESFEESWTPNYK-a7-b11 | Trypsin | hMCAb96 LC | CTHRC1 | 46-61 | 61-77 |
| 6 | VQSGAEVKKPGASVKVSCKASGYTF-EESWTPNY-a21-b5 | Chymotrypsin | hMCAb96 HC | CTHRC1 | 5-29 | 69-76 |
| 7 | LLIYKASNLHSGVPSR-ESFEESWTPNYKQCSWSSLNYGIDLGK-a7-b17 | Trypsin | hMCAb96 LC | CTHRC1 | 46-61 | 66-92 |
| 8 | QAPGQGLEWIGYIYPSSGTTNYNQKFQGR-QCSWSSLNYGIDLGK-a14-b9 | Trypsin | hMCAb96 HC | CTHRC1 | 39-67 | 78-92 |
| 9 | SASLGDTITITCHASQNINVW-GIDLGKIAECTF-a15-b6 | Chymotrypsin | hMCAb96 LC | CTHRC1 | 12-32 | 87-98 |
| 10 | KASNLHSGVPSRF-GKIAECTFTKMRSNSALRVL-a1-b2 | Chymotrypsin | hMCAb96 LC | CTHRC1 | 50-62 | 91-110 |
| 11 | QAPGQGLEWIGYIYPSSGTTNYNQKFQGR-IAECTFTKMR-a16-b5 | Trypsin | hCMAb96 HC | CTHRC1 | 39-67 | 93-102 |
| 12 | QSYPL-KIAECTFTKMRS-a3-b6 | Elastase | hMCAb96 LC | CTHRC1 | 92-96 | 92-103 |
| 13 | GYTFTS-ECTFTKMRS-a5-b5 | Elastase | hCMAb96 HC | CTHRC1 | 26-31 | 95-103 |
| 14 | YYCTTES-AECTFTMRSNS-a4-b9 | Elastase | hCMAb96 HC | CTHRC1 | 94-100 | 94-105 |

[Fig. 23]
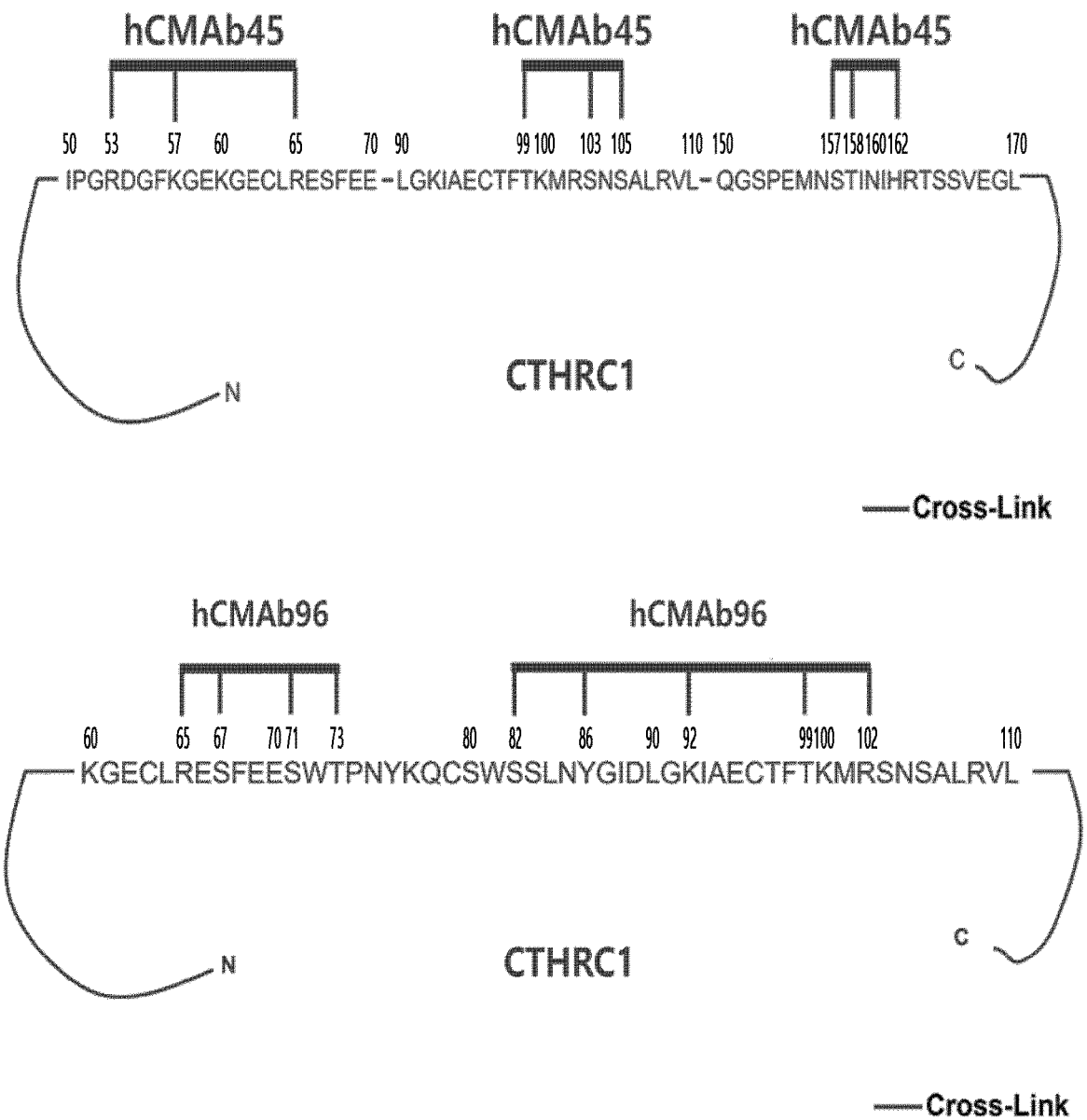

[Fig. 24]
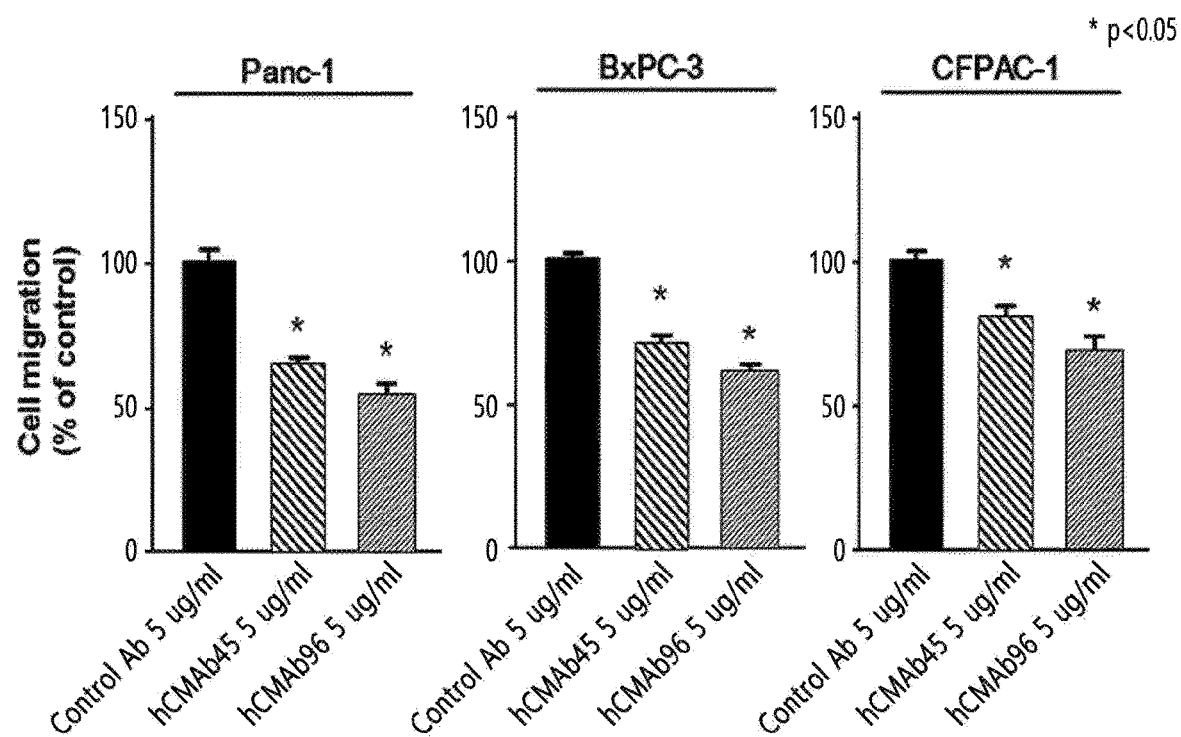

[Fig. 25]
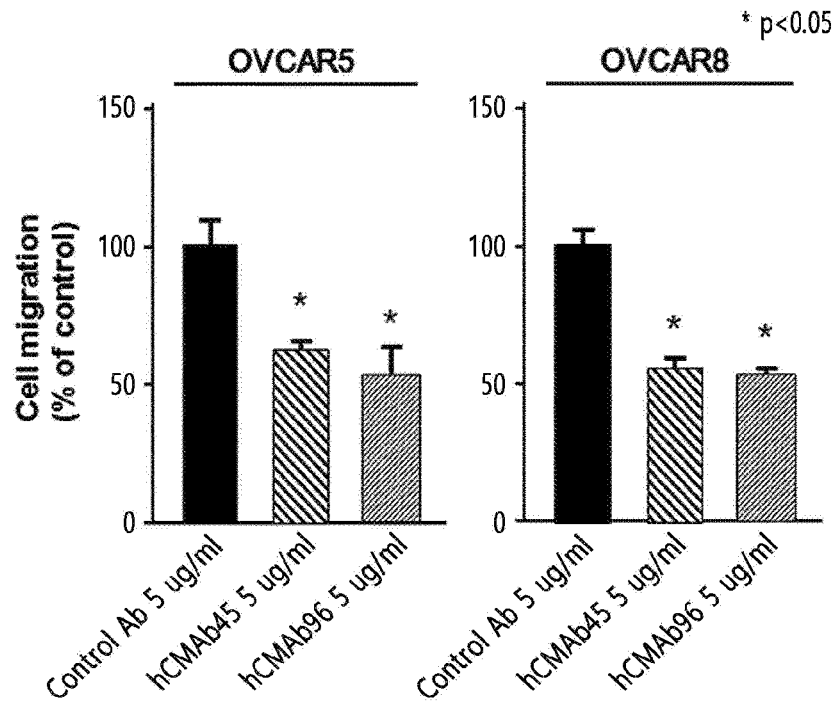
[Fig. 26]
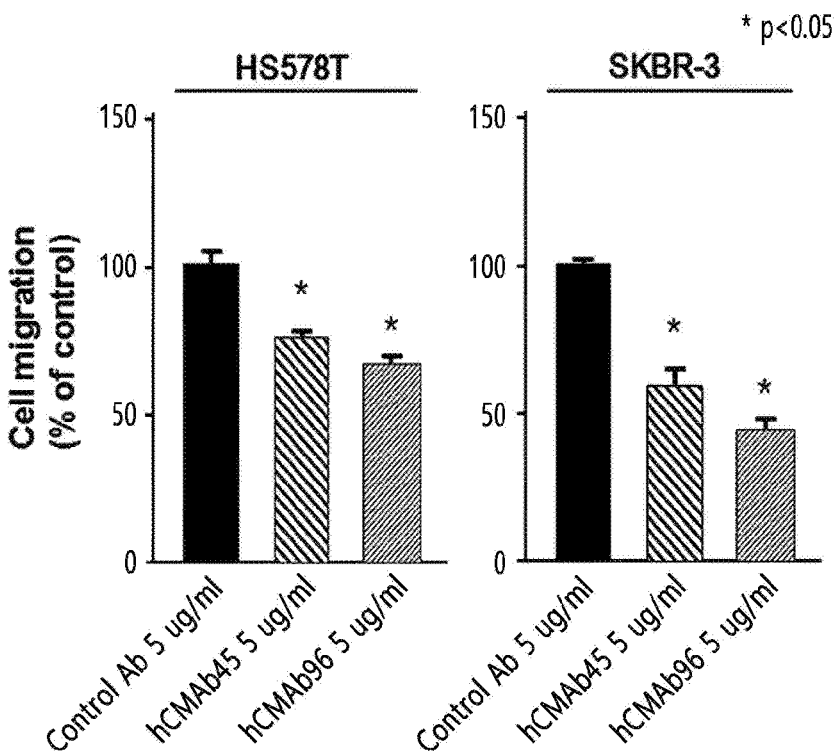

[Fig. 27]
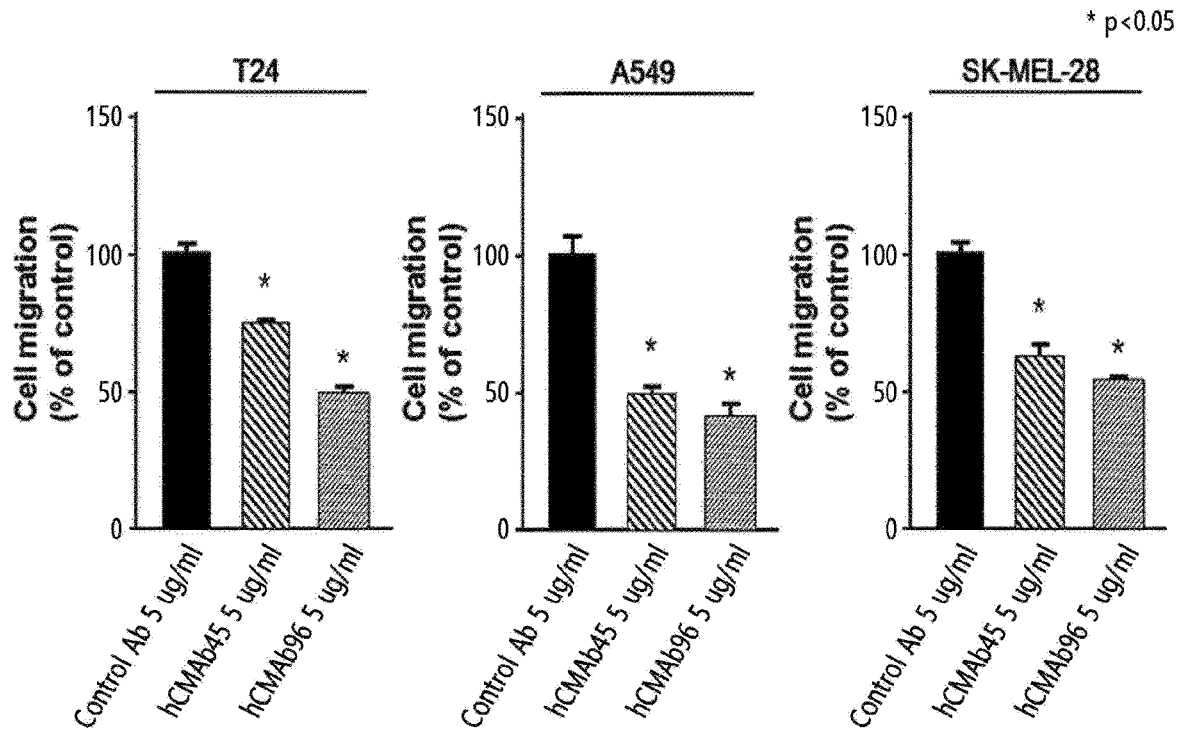
[Fig. 28]
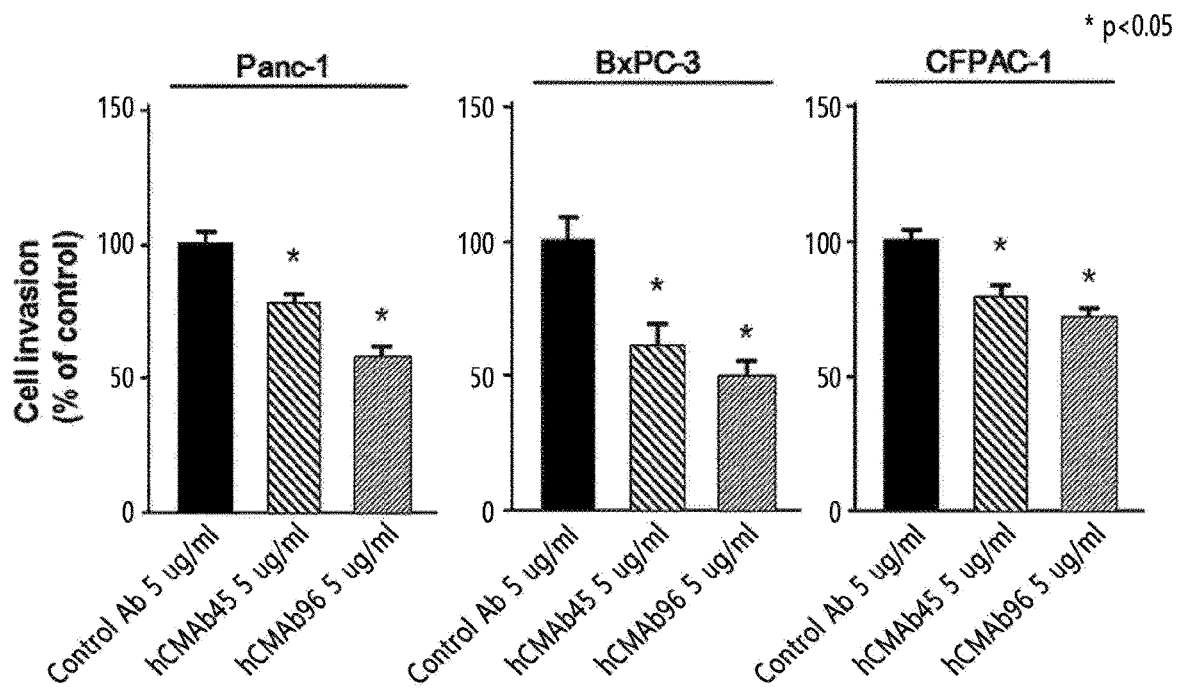

[Fig. 29]
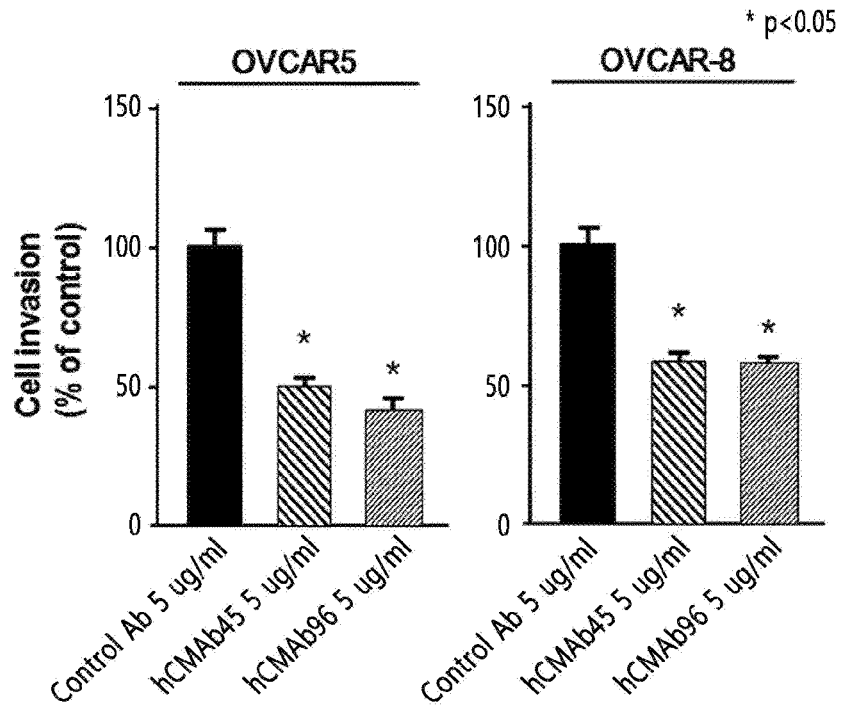
[Fig. 30]
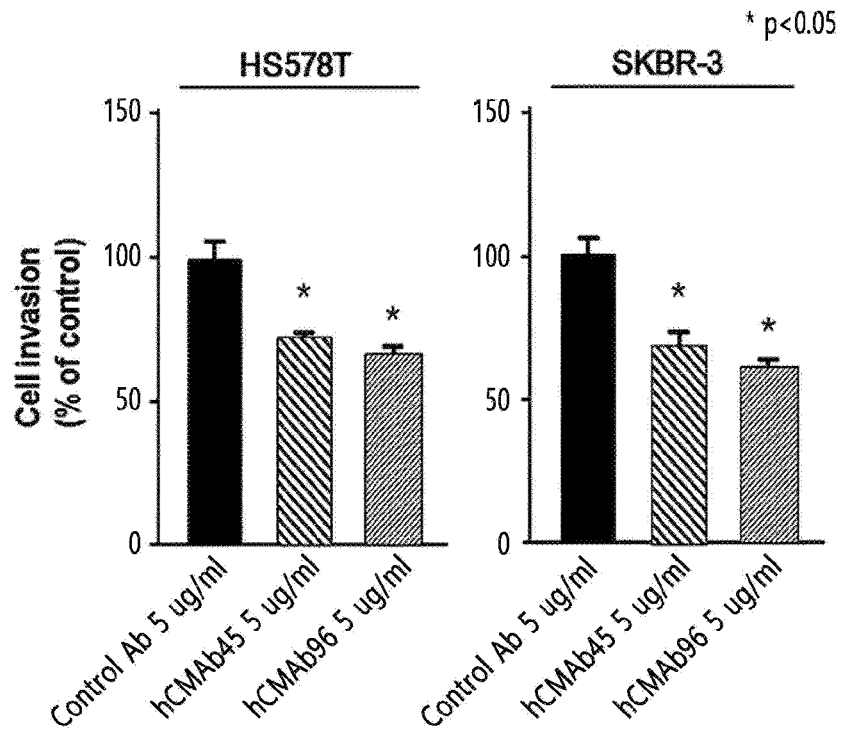

[Fig. 31]
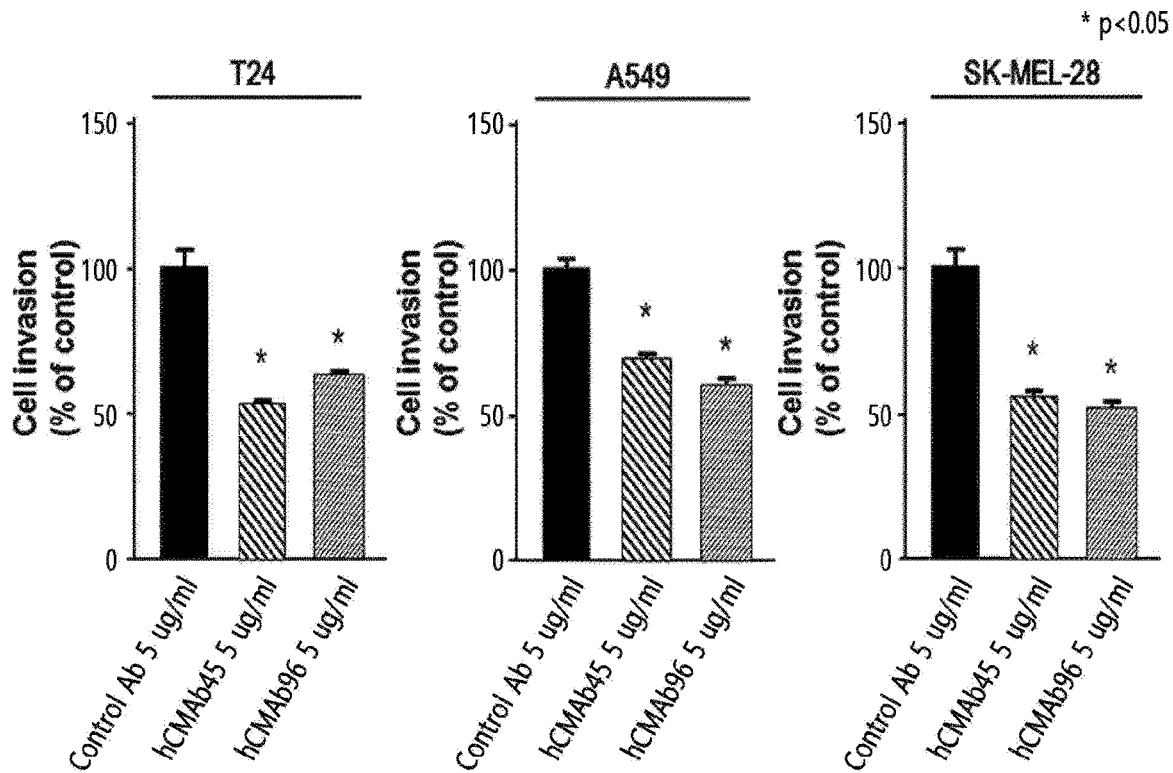
[Fig. 32]
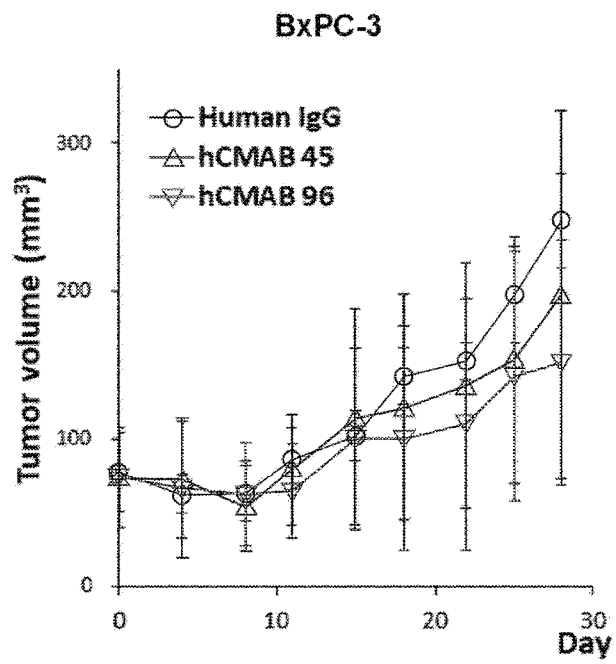

SEQUENCE LISTING

```
<160> NUMBER OF SEQ ID NOS: 30

<210> SEQ ID NO 1
<211> LENGTH: 8
<212> TYPE: PRT
<213> ORGANISM: Artificial Sequence
<220> FEATURE:
<223> OTHER INFORMATION: 4H5-VH-CDR1

<400> SEQUENCE: 1

Gly Tyr Ser Phe Thr Asp Tyr Ile
1               5

<210> SEQ ID NO 2
<211> LENGTH: 8
<212> TYPE: PRT
<213> ORGANISM: Artificial Sequence
<220> FEATURE:
<223> OTHER INFORMATION: 4H5-VH-CDR2

<400> SEQUENCE: 2

Ile Asn Pro Tyr Tyr Gly Ser Thr
1               5

<210> SEQ ID NO 3
<211> LENGTH: 14
<212> TYPE: PRT
<213> ORGANISM: Artificial Sequence
<220> FEATURE:
<223> OTHER INFORMATION: 4H5-VH-CDR3

<400> SEQUENCE: 3

Ala Arg Ser Gly Tyr Gly Tyr Asp Glu Ser Ala Met Asp Tyr
1               5                   10
```

```
<210> SEQ ID NO 4
<211> LENGTH: 11
<212> TYPE: PRT
<213> ORGANISM: Artificial Sequence
<220> FEATURE:
<223> OTHER INFORMATION: 4H5-VL-CDR1

<400> SEQUENCE: 4

Lys Ser Leu Leu Asn Ser Asp Gly Phe Thr Tyr
1               5                   10

<210> SEQ ID NO 5
<211> LENGTH: 3
<212> TYPE: PRT
<213> ORGANISM: Artificial Sequence
<220> FEATURE:
<223> OTHER INFORMATION: 4H5-VL-CDR2

<400> SEQUENCE: 5

Leu Val Ser
1

<210> SEQ ID NO 6
<211> LENGTH: 9
<212> TYPE: PRT
<213> ORGANISM: Artificial Sequence
<220> FEATURE:
<223> OTHER INFORMATION: 4H5-VL-CDR3

<400> SEQUENCE: 6

Phe Gln Ser Asn Tyr Leu Pro Leu Thr
1               5

<210> SEQ ID NO 7
<211> LENGTH: 121
<212> TYPE: PRT
<213> ORGANISM: Artificial Sequence
<220> FEATURE:
<223> OTHER INFORMATION: cCMAb45-Heavy chain

<400> SEQUENCE: 7

Glu Val Gln Leu Gln Gln Ser Gly Pro Glu Leu Val Lys Pro Gly Ala
1               5                   10                  15

Ser Val Lys Ile Ser Cys Lys Ala Ser Gly Tyr Ser Phe Thr Asp Tyr
            20                  25                  30

Ile Met Leu Trp Val Lys Gln Ser His Gly Lys Ser Leu Glu Trp Ile
        35                  40                  45

Gly Asn Ile Asn Pro Tyr Tyr Gly Ser Thr Ser Tyr Asn Leu Lys Phe
    50                  55                  60

Lys Gly Lys Ala Thr Leu Thr Val Asp Lys Ser Ser Ser Thr Ala Tyr
65                  70                  75                  80

Met Gln Leu Asn Ser Leu Thr Ser Glu Asp Ser Ala Val Tyr Tyr Cys
                85                  90                  95

Ala Arg Ser Gly Tyr Gly Tyr Asp Glu Ser Ala Met Asp Tyr Trp Gly
            100                 105                 110

Gln Gly Thr Ser Val Thr Val Ser Ser
        115                 120

<210> SEQ ID NO 8
<211> LENGTH: 363
<212> TYPE: DNA
<213> ORGANISM: Artificial Sequence
<220> FEATURE:
<223> OTHER INFORMATION: cCMAb45-Heavy chain
```

```
<400> SEQUENCE: 8
gaggtccagc tgcaacagtc tggacctgag ctggtgaagc tggggcttc agtgaagata      60 tcctgcaagg cttctggtta ttcattcact gactacatca tgctctgggt gaagcagagc    120 catgaaaga gccttgagtg gattggaaat attaatcctt actatggtag tactagctac     180
aatctgaagt tcaagggcaa ggccacattg actgtagaca atcttccag cacagcctac     240 atgcagctca acagtctgac atctgaggac tctgcagtct attactgtgc aagatcgggc    300
tatggttacg acgagagtgc tatggactac tggggtcaag aacctcagt caccgtctcc     360 tca                                                                   363

<210> SEQ ID NO 9
<211> LENGTH: 112
<212> TYPE: PRT
<213> ORGANISM: Artificial Sequence
<220> FEATURE:
<223> OTHER INFORMATION: cCMAb45-Light chain

<400> SEQUENCE: 9

Asp Val Leu Met Thr Gln Thr Pro Leu Ser Leu Pro Val Asn Ile Gly
1               5                   10                  15

Asp Gln Ala Ser Ile Ser Cys Lys Ser Thr Lys Ser Leu Leu Asn Ser
            20                  25                  30

Asp Gly Phe Thr Tyr Leu Asp Trp Tyr Leu Gln Lys Pro Gly Gln Ser
        35                  40                  45

Pro Gln Leu Leu Ile Tyr Leu Val Ser Asn Arg Phe Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Glu Asp Leu Gly Val Tyr Tyr Cys Phe Gln Ser
                85                  90                  95

Asn Tyr Leu Pro Leu Thr Phe Gly Ser Gly Thr Lys Leu Glu Ile Lys
            100                 105                 110

<210> SEQ ID NO 10
<211> LENGTH: 336
<212> TYPE: DNA
<213> ORGANISM: Artificial Sequence
<220> FEATURE:
<223> OTHER INFORMATION: cCMAb45-Light chain

<400> SEQUENCE: 10
gatgttttga tgacccaaac tccactctct ctgcctgtca atattggaga tcaagcctct      60
atctcttgca gtctactaa gagtcttctg aatagtgatg gattcactta tttggactgg     120
tacctgcaga agccaggcca gtctccacag ctcctaatat atttggtttc taatcgattt    180
tctggagttc cagacaggtt cagtggcagt gggtcaggaa cagatttcac actcaagatc    240
agcagagtgg aggctgagga tttgggagtt tattattgct tccagagtaa ctatcttcct    300
ctcacgttcg gctcggggac aaagttggaa ataaaa                              336

<210> SEQ ID NO 11
<211> LENGTH: 8
<212> TYPE: PRT
<213> ORGANISM: Artificial Sequence
<220> FEATURE:
<223> OTHER INFORMATION: 9E6-VH-CDR1
```

```
<400> SEQUENCE: 11

Gly Tyr Thr Phe Thr Ser Tyr Trp
1               5

<210> SEQ ID NO 12
<211> LENGTH: 8
<212> TYPE: PRT
<213> ORGANISM: Artificial Sequence
<220> FEATURE:
<223> OTHER INFORMATION: 9E6-VH-CDR2

<400> SEQUENCE: 12

Ile Tyr Pro Ser Ser Gly Thr Thr
1               5

<210> SEQ ID NO 13
<211> LENGTH: 5
<212> TYPE: PRT
<213> ORGANISM: Artificial Sequence
<220> FEATURE:
<223> OTHER INFORMATION: 9E6-VH-CDR3

<400> SEQUENCE: 13

Thr Thr Glu Ser Tyr
1               5

<210> SEQ ID NO 14
<211> LENGTH: 6
<212> TYPE: PRT
<213> ORGANISM: Artificial Sequence
<220> FEATURE:
<223> OTHER INFORMATION: 9E6-VL-CDR1

<400> SEQUENCE: 14

Gln Asn Ile Asn Val Trp
1               5

<210> SEQ ID NO 15
<211> LENGTH: 3
<212> TYPE: PRT
<213> ORGANISM: Artificial Sequence
<220> FEATURE:
<223> OTHER INFORMATION: 9E6-VL-CDR2

<400> SEQUENCE: 15

Lys Ala Ser
1

<210> SEQ ID NO 16
<211> LENGTH: 9
<212> TYPE: PRT
<213> ORGANISM: Artificial Sequence
<220> FEATURE:
<223> OTHER INFORMATION: 9E6-VL-CDR3

<400> SEQUENCE: 16

Gln Gln Gly Gln Ser Tyr Pro Leu Thr
1               5

<210> SEQ ID NO 17
<211> LENGTH: 112
<212> TYPE: PRT
<213> ORGANISM: Artificial Sequence
<220> FEATURE:
<223> OTHER INFORMATION: cCMAb96-Heavy chain
```

<400> SEQUENCE: 17

```
Gln Val Gln Leu Gln Gln Pro Gly Ser Glu Leu Val Arg Pro Gly Ala
1               5                   10                  15
Ser Val Lys Leu Ser Cys Lys Ala Ser Gly Tyr Thr Phe Thr Ser Tyr
            20                  25                  30
Trp Met His Trp Val Lys Gln Arg Pro Gly Gln Gly Leu Glu Trp Ile
        35                  40                  45
Gly Asn Ile Tyr Pro Ser Ser Gly Thr Thr Asn Tyr Asp Glu Lys Phe
    50                  55                  60
Lys Asn Lys Ala Thr Leu Thr Val Asp Thr Ser Ser Thr Thr Ala Tyr
65                  70                  75                  80
Met His Leu Ser Ser Leu Thr Ser Glu Asp Ser Ala Val Tyr Tyr Cys
                85                  90                  95
Thr Thr Glu Ser Tyr Trp Gly Gln Gly Thr Thr Leu Thr Val Ser Ser
            100                 105                 110
```

<210> SEQ ID NO 18
<211> LENGTH: 336
<212> TYPE: DNA
<213> ORGANISM: Artificial Sequence
<220> FEATURE:
<223> OTHER INFORMATION: cCMAb96-Heavy chain

<400> SEQUENCE: 18

```
caggtccaac tgcagcagcc tgggtctgag ctggtgaggc ctggagcttc agtgaagctg      60
tcctgcaagg cttctggcta cacattcacc agctactgga tgcactgggt gaagcagagg     120
cctggacaag gccttgagtg gattggaaat atttatccta gtagtggtac tactaactac     180
gatgagaagt tcaagaacaa ggccacactg actgtagaca catcctccac cacagcctac     240
atgcacctca gcagcctgac atctgaggac tctgcggtct attactgtac aacagagtct     300
tactggggcc aaggcaccac tctcacagtc tcctca                               336
```

<210> SEQ ID NO 19
<211> LENGTH: 107
<212> TYPE: PRT
<213> ORGANISM: Artificial Sequence
<220> FEATURE:
<223> OTHER INFORMATION: cCMAb96-Light chain

<400> SEQUENCE: 19

```
Asp Ile Val Met Thr Gln Ser Pro Ser Ser Leu Ser Ala Ser Leu Gly
1               5                   10                  15
Asp Thr Ile Thr Ile Thr Cys His Ala Ser Gln Asn Ile Asn Val Trp
            20                  25                  30
Leu Ser Trp Tyr Gln Gln Lys Pro Gly Asn Ile Pro Lys Leu Leu Ile
        35                  40                  45
Tyr Lys Ala Ser Asn Leu His Thr Gly Val Pro Ser Arg Phe Ser Gly
    50                  55                  60
Ser Gly Ser Gly Thr Gly Phe Thr Leu Thr Ile Ser Ser Leu Gln Pro
65                  70                  75                  80
Glu Asp Ile Ala Thr Tyr Tyr Cys Gln Gln Gly Gln Ser Tyr Pro Leu
                85                  90                  95
Thr Phe Gly Gly Gly Thr Lys Leu Glu Ile Lys
            100                 105
```

<210> SEQ ID NO 20
<211> LENGTH: 321

<212> TYPE: DNA
<213> ORGANISM: Artificial Sequence
<220> FEATURE:
<223> OTHER INFORMATION: cCMAb96-Light chain

<400> SEQUENCE: 20

```
gacattgtga tgacccagtc tccatccagt ctgtctgcat cccttggaga cacaattacc    60
atcacttgcc atgccagtca gaacattaat gtttggttaa gctggtacca gcagaaacca   120
ggaaatattc ctaaactatt gatctataag gcttccaact tgcacacagg cgtcccatca   180
aggtttagtg gcagtggatc tggaacaggt ttcacattaa ccatcagcag cctgcagcct   240
gaagacattg ccacttacta ctgtcaacag ggtcaaagtt atcctctgac gttcggtgga   300
ggcaccaagc tggaaatcaa a                                             321
```

<210> SEQ ID NO 21
<211> LENGTH: 121
<212> TYPE: PRT
<213> ORGANISM: Artificial Sequence
<220> FEATURE:
<223> OTHER INFORMATION: hCMAb45-Heavy chain

<400> SEQUENCE: 21

```
Gln Val Gln Leu Val Glu Ser Gly Ala Glu Val Lys Lys Pro Gly Ala
1               5                   10                  15
Ser Val Lys Val Ser Cys Lys Ala Ser Gly Tyr Ser Phe Thr Asp Tyr
            20                  25                  30
Ile Ile Leu Trp Val Arg Gln Ala Pro Gly Gln Gly Leu Glu Trp Met
        35                  40                  45
Gly Ala Ile Asn Pro Tyr Tyr Gly Ser Thr Val Tyr Gly Gln Lys Phe
    50                  55                  60
Gln Gly Arg Leu Thr Ile Thr Ala Asp Gly Ser Met Ser Thr Ala Tyr
65                  70                  75                  80
Met Glu Leu Ser Ser Leu Arg Ser Glu Asp Thr Ala Val Tyr Tyr Cys
                85                  90                  95
Ala Arg Ser Gly Tyr Gly Tyr Asp Glu Ser Ala Met Asp Tyr Trp Gly
            100                 105                 110
Gln Gly Thr Leu Val Thr Val Ser Ser
        115                 120
```

<210> SEQ ID NO 22
<211> LENGTH: 363
<212> TYPE: DNA
<213> ORGANISM: Artificial Sequence
<220> FEATURE:
<223> OTHER INFORMATION: hCMAb45-Heavy chain

<400> SEQUENCE: 22

```
caggtgcagc tggtggagtc tggggctgag gtgaagaagc ctggggcctc agtgaaggtt    60
tcctgcaagg cttctggtta ttcattcact gactacatca tattatgggt gcggcaggcg   120
cctggacaag gcttgagtg gatgggagca attaatcctt actatggtag tactgtgtac   180
gggcagaagt tccagggcag actcaccatt accgcggacg gtctatgag cacagcctac   240
atggagctga gcagcctgag atctgaggac actgcagtct attactgtgc aagatcgggc   300
tatggttacg acgagagtgc tatggactac tggggtcaag aaccctagt caccgtctcc   360
tca                                                                 363
```

<210> SEQ ID NO 23

<211> LENGTH: 112
<212> TYPE: PRT
<213> ORGANISM: Artificial Sequence
<220> FEATURE:
<223> OTHER INFORMATION: hCMAb45-Light chain

<400> SEQUENCE: 23

```
Asp Ile Val Met Thr Gln Thr Pro Leu Ser Leu Pro Val Thr Pro Gly
1               5                   10                  15

Glu Pro Ala Ser Ile Ser Cys Arg Ser Ser Lys Ser Leu Leu Asn Ser
            20                  25                  30

Asp Gly Phe Thr Tyr Leu Asp Trp Tyr Leu Gln Lys Pro Gly Gln Ser
        35                  40                  45

Pro Gln Leu Leu Ile Tyr Leu Val Ser Asn Arg Phe Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Glu Asp Val Gly Val Tyr Tyr Cys Phe Gln Ser
                85                  90                  95

Asn Tyr Leu Pro Leu Thr Phe Gly Gln Gly Thr Lys Leu Glu Ile Lys
            100                 105                 110
```

<210> SEQ ID NO 24
<211> LENGTH: 336
<212> TYPE: DNA
<213> ORGANISM: Artificial Sequence
<220> FEATURE:
<223> OTHER INFORMATION: hCMAb45-Light chain

<400> SEQUENCE: 24

```
gatattgtga tgacccagac tccactctcc ctgcccgtca cccctggaga gccggcctct     60
atctcttgcc ggtctagtaa gagtcttctg aatagtgatg gattcactta tttggactgg    120
tacctgcaga agccaggcca gtctccacag ctcctaatat atttggtttc taatcgattt    180
tctggagttc cagacaggtt cagtggcagt gggtcaggaa cagatttcac actcaagatc    240
agcagagtgg aggctgagga tgttggagtt tattattgct tccagagtaa ctatcttcct    300
ctcacgttcg gccaggggac aaagttggaa ataaaa                              336
```

<210> SEQ ID NO 25
<211> LENGTH: 112
<212> TYPE: PRT
<213> ORGANISM: Artificial Sequence
<220> FEATURE:
<223> OTHER INFORMATION: hCMAb96-Heavy chain

<400> SEQUENCE: 25

```
Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Ser Tyr
            20                  25                  30

Trp Met His Trp Val Arg Gln Ala Pro Gly Gln Gly Leu Glu Trp Ile
        35                  40                  45

Gly Tyr Ile Tyr Pro Ser Ser Gly Thr Thr Asn Tyr Asn Gln Lys Phe
    50                  55                  60

Gln Gly Arg Val Thr Ile Thr Ala Asp Glu Ser Thr Ser Thr Ala Tyr
65                  70                  75                  80

Met Glu Leu Ser Pro Leu Arg Ser Glu Asp Thr Ala Val Tyr Tyr Cys
                85                  90                  95
```

```
Thr Thr Glu Ser Tyr Trp Gly Gln Gly Thr Thr Val Thr Val Ser Ser
            100                 105                 110
```

```
<210> SEQ ID NO 26
<211> LENGTH: 336
<212> TYPE: DNA
<213> ORGANISM: Artificial Sequence
<220> FEATURE:
<223> OTHER INFORMATION: hCMAb96-Heavy chain

<400> SEQUENCE: 26
caggtccaac tggtacagtc tggggctgaa gtgaagaagc ctggggcttc agtgaaggtc    60
tcctgtaagg cttctggcta cacattcacc agctactgga tgcactgggt ccgtcaagct   120
ccgggacaag gctggagtg dattggatat atttatccta gtagtggtac tactaactac   180
aaccaaaagt tccagggcag agtcacgatt accgcggacg aatccacgag cacagcctac   240
atggagctga ccccctgag atctgaggac acagcggtct attactgtac aacagagtct   300
tactggggcc agggaaccac tgtcaccgtc tcctca                              336
```

```
<210> SEQ ID NO 27
<211> LENGTH: 107
<212> TYPE: PRT
<213> ORGANISM: Artificial Sequence
<220> FEATURE:
<223> OTHER INFORMATION: hCMAb96-Light chain

<400> SEQUENCE: 27

Asp Ile Gln Met Thr Gln Ser Pro Ser Ser Leu Ser Ala Ser Leu Gly
1               5                   10                  15

Asp Thr Ile Thr Ile Thr Cys His Ala Ser Gln Asn Ile Asn Val Trp
            20                  25                  30

Leu Ala Trp Tyr Gln Gln Lys Pro Gly Lys Ala Pro Lys Leu Leu Ile
        35                  40                  45

Tyr Lys Ala Ser Asn Leu His Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Ile Ala Thr Tyr Tyr Cys Gln Gln Gly Gln Ser Tyr Pro Leu
                85                  90                  95

Thr Phe Gly Gln Gly Thr Lys Val Glu Ile Lys
            100                 105
```

```
<210> SEQ ID NO 28
<211> LENGTH: 321
<212> TYPE: DNA
<213> ORGANISM: Artificial Sequence
<220> FEATURE:
<223> OTHER INFORMATION: hCMAb96-Light chain

<400> SEQUENCE: 28
gacattcaga tgacccagtc tccatccagt ctgtctgcat cccttggaga cacaattacc    60
atcacttgcc atgccagtca gaacattaat gtttggttag cctggtatca gcagaaacca   120
gggaaagccc ctaaactatt gatctataag gcttccaact tgcacagtgg cgtcccatca   180
aggtttagtg gcagtggatc tggaacagat ttcactctca ccatcagcag cctgcagcct   240
gaagacattg ccacttacta ctgtcaacag ggtcaaagtt atcctctgac gttcggccag   300
gggaccaagg tggaaatcaa a                                              321
```

```
<210> SEQ ID NO 29
<211> LENGTH: 236
<212> TYPE: PRT
<213> ORGANISM: Artificial Sequence
<220> FEATURE:
<223> OTHER INFORMATION: Recombinant CTHRC1-His sequence

<400> SEQUENCE: 29

Gly Ala Val Gly Ala Ser Glu Ile Pro Lys Gly Lys Gln Lys Ala Gln
1               5                   10                  15

Leu Arg Gln Arg Glu Val Val Asp Leu Tyr Asn Gly Met Cys Leu Gln
                20                  25                  30

Gly Pro Ala Gly Val Pro Gly Arg Asp Gly Ser Pro Gly Ala Asn Gly
            35                  40                  45

Ile Pro Gly Thr Pro Gly Ile Pro Gly Arg Asp Gly Phe Lys Gly Glu
        50                  55                  60

Lys Gly Glu Cys Leu Arg Glu Ser Phe Glu Glu Ser Trp Thr Pro Asn
65                  70                  75                  80

Tyr Lys Gln Cys Ser Trp Ser Ser Leu Asn Tyr Gly Ile Asp Leu Gly
                85                  90                  95

Lys Ile Ala Glu Cys Thr Phe Thr Lys Met Arg Ser Asn Ser Ala Leu
            100                 105                 110

Arg Val Leu Phe Ser Gly Ser Leu Arg Leu Lys Cys Arg Asn Ala Cys
        115                 120                 125

Cys Gln Arg Trp Tyr Phe Thr Phe Asn Gly Ala Glu Cys Ser Gly Pro
    130                 135                 140

Leu Pro Ile Glu Ala Ile Ile Tyr Leu Asp Gln Gly Ser Pro Glu Met
145                 150                 155                 160

Asn Ser Thr Ile Asn Ile His Arg Thr Ser Ser Val Glu Gly Leu Cys
                165                 170                 175

Glu Gly Ile Gly Ala Gly Leu Val Asp Val Ala Ile Trp Val Gly Thr
            180                 185                 190

Cys Ser Asp Tyr Pro Lys Gly Asp Ala Ser Thr Gly Trp Asn Ser Val
        195                 200                 205

Ser Arg Ile Ile Ile Glu Glu Leu Pro Lys Leu Ala Ala Ser Ala Asn
    210                 215                 220

Ser Ala Val Asp His His His His His His
225                 230                 235

<210> SEQ ID NO 30
<211> LENGTH: 213
<212> TYPE: PRT
<213> ORGANISM: Artificial Sequence
<220> FEATURE:
<223> OTHER INFORMATION: CTHRC1 sequence

<400> SEQUENCE: 30

Ser Glu Ile Pro Lys Gly Lys Gln Lys Ala Gln Leu Arg Gln Arg Glu
1               5                   10                  15

Val Val Asp Leu Tyr Asn Gly Met Cys Leu Gln Gly Pro Ala Gly Val
                20                  25                  30

Pro Gly Arg Asp Gly Ser Pro Gly Ala Asn Gly Ile Pro Gly Thr Pro
            35                  40                  45

Gly Ile Pro Gly Arg Asp Gly Phe Lys Gly Glu Lys Gly Glu Cys Leu
        50                  55                  60

Arg Glu Ser Phe Glu Glu Ser Trp Thr Pro Asn Tyr Lys Gln Cys Ser
65                  70                  75                  80
```

-continued

```
Trp Ser Ser Leu Asn Tyr Gly Ile Asp Leu Gly Lys Ile Ala Glu Cys
                85              90              95

Thr Phe Thr Lys Met Arg Ser Asn Ser Ala Leu Arg Val Leu Phe Ser
            100             105             110

Gly Ser Leu Arg Leu Lys Cys Arg Asn Ala Cys Cys Gln Arg Trp Tyr
            115             120             125

Phe Thr Phe Asn Gly Ala Glu Cys Ser Gly Pro Leu Pro Ile Glu Ala
            130             135             140

Ile Ile Tyr Leu Asp Gln Gly Ser Pro Glu Met Asn Ser Thr Ile Asn
145             150             155             160

Ile His Arg Thr Ser Ser Val Glu Gly Leu Cys Glu Gly Ile Gly Ala
            165             170             175

Gly Leu Val Asp Val Ala Ile Trp Val Gly Thr Cys Ser Asp Tyr Pro
            180             185             190

Lys Gly Asp Ala Ser Thr Gly Trp Asn Ser Val Ser Arg Ile Ile Ile
            195             200             205

Glu Glu Leu Pro Lys
            210
```

CTHRC1-SPECIFIC ANTIBODY AND USE THEREOF

CROSS-REFERENCE TO RELATED APPLICATIONS

This application is a continuation-in-part of PCT/IB2020/055561, filed Jun. 15, 2020, claiming priority of Korean Patent Application No. 10-2019-0070048, filed Jun. 13, 2019, the contents of each of which are hereby incorporated by reference herein.

REFERENCE TO A SEQUENCE LISTING

This application incorporates-by-reference nucleotide and/or amino acid sequences which are present in the file named "211213_91832_95991_0051_Sequence_Listing_SC.txt", which is 19 kilobytes in size, and which was created Dec. 13, 2021 in the IBM-PC machine format, having an operating system compatibility with MS-Windows, which is contained in the text file filed Dec. 13, 2021 as part of this application.

TECHNICAL FIELD

The present invention relates to a novel antibody which binds to CTHRC1 and use thereof.

BACKGROUND ART

Anticancer drugs currently in clinical use may be classified as chemotherapeutic agents and biotherapeutic agents. The chemotherapeutic agents actively developed in the past are drugs that show toxicity to cancer cells, and these drugs have problems in that they are toxic to normal cells as well as cancer cells and are also subject to tolerance. Therefore, there are limitations to the development and use of these drugs. As such, in recent years, biotherapeutic agents that can recover or increase the immune function of the human body and thereby weaken the activity of cancer cells are being actively developed as an alternative. Examples of biotherapeutic agents which are currently in use or under development include cytokines, recombinant antibodies (e.g., monoclonal antibodies), nucleic acid molecule therapeutics, angiogenesis inhibitors, etc.

Among the biotherapeutic agents, therapeutic monoclonal antibodies are characterized by having low side effects due to their high reaction specificity to targets. Antibodies exhibit therapeutic effects through various mechanisms; for example, they may specifically bind to the corresponding antigens to inhibit signal transduction or induce apoptosis by cross-linking, and additionally, may exhibit therapeutic effects by activating the immune system in vivo. Accordingly, monoclonal antibodies as anticancer agents can specifically track cancer cells and inhibit their activity as well as induce immune responses and can thereby effectively remove cancer cells. As a result, treatment using monoclonal antibodies is becoming a mainstream cancer treatment. In this regard, monoclonal antibodies such as ramucirumab, rituximab, trastuzumab, etc. have been developed and used in the treatment of gastric cancer, breast cancer, liver cancer, etc.

Meanwhile, collagen triple helix repeat containing-1 (CTHRC1) is known as a secreted protein involved in vascular remodeling, bone formation, and developmental morphogenesis.

According to recent studies, it has been reported that CTHRC1 is overexpressed in various types of cancer cells, such as pancreatic cancer, ovarian cancer, breast cancer, melanoma, etc., and thus is related to the proliferation or metastasis of cancer. Accordingly, these results imply that CTHRC1 has an important role in aggressive tumors. It is also known that CTHRC1 not only induces proliferation and metastasis of cancer cells, but also stimulates endothelial cells in the tumor microenvironment and thereby participates in angiogenesis (Park et al., Carcinogenesis (2013) 34:694, Lee et al., *ExpMolMed* (2016) 48:e261). As a result of the human tumor cDNA array analysis, it was found that CTHRC1 is mainly expressed in human solid tumors, and as a result of the transcriptome analysis, it was confirmed that there is a difference in expression between breast lobular carcinoma and normal ductal and lobular cells. It has also been found that CTHRC1 was expressed in invasive primary melanomas and metastatic melanomas, but was not expressed in benign nevi or non-invasive samples. Additionally, inhibition of CTHRC1 expression reduced migration of melanoma cell lines in vitro. CTHRC1 was identified in dermatofibrosarcoma protuberans, which is a locally aggressive neoplasm that metastasizes frequently, but not in dermatosarcoma or typical benign fibrohistiocytic tumor. Further, it has been reported that CTHRC1 expression is significantly high in breast cancer tissues compared to normal tissues or precursor lesions, and is associated with the risk of bone metastasis. However, there is still a need for the development of antibodies that improve the binding and affinity to CTHRC1 protein and have excellent effects in diagnosing and treating various types of cancer at the same time.

DISCLOSURE

Technical Problem

The development of antibodies that specifically bind to CTHRC1 has been continuously required for the treatment of various cancers, including intractable cancer. Accordingly, the present inventors have developed a new antibody having high affinity and specificity, and have confirmed that the antibody has an anticancer effect in various cancers, thereby completing the present invention.

Technical Solution

One object of the present invention is to provide an antibody that specifically binds to collagen triple helix repeat containing-1 (CTHRC1) protein.

Another object of the present invention is to provide a polynucleotide encoding the antibody that specifically binds to CTHRC1 protein; an expression vector including the polynucleotide; and a host cell including the expression vector.

Still another object of the present invention is to provide a composition and a kit for detecting the antibody that specifically binds to CTHRC1 protein.

Even another object of the present invention is to provide a pharmaceutical composition for preventing or treating cancer, including the antibody.

Yet another object of the present invention is to provide a method for treating cancer using the antibody.

Further another object of the present invention is to provide a composition for diagnosing cancer or predicting prognosis of cancer, including the antibody.

Still further another object of the present invention is to provide a method of providing information for diagnosing cancer, including: detecting CTHRC1 protein in a biological sample isolated from a subject suspected of having cancer through an antigen-antibody reaction, using the antibody.

Still further another object of the present invention is to provide a method of providing information for predicting prognosis of cancer, including: detecting CTHRC1 protein in a biological sample isolated from a subject suffering from cancer through an antigen-antibody reaction, using the antibody.

Still further another object of the present invention is to provide a kit for diagnosing cancer or predicting prognosis of cancer, including the composition for diagnosing cancer or predicting prognosis of cancer.

Still further another object of the present invention is to provide a method for detecting CTHRC1 protein in a sample, including detecting an CTHRC1 antigen-antibody complex using the antibody that specifically binds to CTHRC1 protein.

Advantageous Effects

The novel antibody of the present invention can detect a trace amount of CTHRC1 and can also detect CTHRC1 conjugate vaccines, and thus can be effectively used for quantification of CTHRC1 and CTHRC1 conjugate vaccines.

BRIEF DESCRIPTION OF DRAWINGS

FIG. 1 is a result of indirect ELISA for 4H5 and 9E6 mouse antibodies having high binding affinity to CTHRC1 (Sensitivity: 4H5,9E6>>1D1>6C1).

FIG. 2 is a result confirming that the 4H5 and 9E6 mouse antibodies have different epitopes, which suggests that they can induce an anticancer action through different mechanisms.

FIG. 3 is a result confirming that cCMAb45 and cCMAb96 not only have high binding affinity to CTHRC1 protein but also specifically bind thereto.

FIG. 4 is a result confirming the inhibitory effect of cCMAb45 and cCMAb96 on the migration of pancreatic cancer in vitro.

FIG. 5 is a result of confirming the inhibitory effect of cCMAb45 and cCMAb96 on the migration of breast cancer in vitro.

FIG. 6 is a result confirming the inhibitory effect of cCMAb45 and cCMAb96 on the migration of ovarian cancer in vitro.

FIG. 7 is a result confirming the inhibitory effect of cCMAb45 and cCMAb96 on the migration of bladder cancer in vitro.

FIG. 8 is a result confirming the inhibitory effect of cCMAb45 and cCMAb96 on the invasion of pancreatic cancer in vitro.

FIG. 9 is a result confirming the inhibitory effect of cCMAb45 and cCMAb96 on the invasion of patient-derived pancreatic cancer cells in vitro.

FIG. 10 is a result confirming the inhibitory effect of cCMAb45 and cCMAb96 on the invasion of breast cancer in vitro.

FIG. 11 is a result confirming the inhibitory effect of cCMAb45 and cCMAb96 on the invasion of ovarian cancer in vitro.

FIG. 12 is a result confirming the inhibitory effect of cCMAb45 and cCMAb96 on the invasion of bladder cancer in vitro.

FIG. 13 is a result of production of the 4H5 and 9E6 humanized candidate antibodies.

FIG. 14 is a result of measuring the binding affinity of the 4H5 and 9E6 humanized candidate antibodies.

FIG. 15 is a result of verifying the efficacy of the 4H5 and 9E6 humanized candidate antibodies using the pancreatic cancer cell line Panc-1.

FIG. 16 is a result of re-measuring the binding affinity of the 4H5 and 9E6 humanized candidate antibodies selected as primary antibodies.

FIG. 17 is a result of re-verifying the efficacy of the 4H5 and 9E6 humanized candidate antibodies firstly selected.

FIG. 18 is a result confirming that hCMAb45 and hCMAb96 specifically bind to CTHRC1 protein.

FIG. 19a and FIG. 19b shows the results of mass spectrometry of each CTHRC1 protein (during analysis of hCMAb45 (a) and hCMAb96 (b)).

FIG. 20a and FIG. 20b shows the results of mass spectrometry of hCMAb45 (a) and hCMAb96 (b).

FIG. 21a and FIG. 21b shows the results of mass spectrometry of a mixed protein of CTHRC1 and hCMAb45 (a) or CTHRC1 and hCMAb96 (b), which are covalently bound by a crosslinking reagent. The results suggest that CTHRC1 can bind to all of monomers, dimers, and trimers of both antibodies, and in particular, predominantly to trimers.

FIG. 22 shows the results of mass spectrometry of fragments of the mixed protein of CTHRC1 and hCMAb45 or CTHRC1 and hCMAb96, which were cleaved by a protease.

FIG. 23 shows a schematic diagram illustrating the epitope sequences recognized by hCMAb45 or hCMAb96 and positions thereof.

FIG. 24 is a result confirming the inhibitory effect of hCMAb45 and hCMAb96 on the migration of pancreatic cancer in vitro.

FIG. 25 is a result confirming the inhibitory effect of hCMAb45 and hCMAb96 on the migration of ovarian cancer in vitro.

FIG. 26 is a result of confirming the inhibitory effect of hCMAb45 and hCMAb96 on the migration of breast cancer in vitro.

FIG. 27 is a result of confirming the inhibitory effect of hCMAb45 and hCMAb96 on the migration of bladder cancer, lung cancer, and melanoma in vitro.

FIG. 28 is a result confirming the inhibitory effect of hCMAb45 and hCMAb96 on the invasion of pancreatic cancer in vitro.

FIG. 29 is a result confirming the inhibitory effect of hCMAb45 and hCMAb96 on the invasion of ovarian cancer in vitro.

FIG. 30 is a result confirming the inhibitory effect of hCMAb45 and hCMAb96 on the invasion of breast cancer in vitro.

FIG. 31 is a result confirming the inhibitory effect of hCMAb45 and hCMAb96 on the invasion of bladder cancer, lung cancer, and melanoma in vitro.

FIG. 32 is a result confirming the in vivo anticancer effect of hCMAb45 and hCMAb96. The model using the pancreatic cancer cell line BxPC-3 shows a reduced tumor volume compared to the control group.

DETAILED DESCRIPTION OF PREFERRED EMBODIMENTS

The present invention will be described in detail below. Meanwhile, each description and embodiment disclosed herein can be applied to other descriptions and embodiments, respectively. That is, all combinations of various elements disclosed herein fall within the scope of the present invention. Further, the scope of the present invention is not limited by the specific description described below.

Throughout the disclosure of the present invention, the conventional 1-letter codes and 3-letter codes for naturally-occurring amino acids are used. Additionally, the amino acids mentioned in abbreviation in the present disclosure are described according to the IUPAC-IUB Nomenclature.

| alanine | Ala, A | arginine | Arg, R |
|---|---|---|---|
| asparagine | Asn, N | aspartic acid | Asp, D |
| cysteine | Cys, C | glutamic acid | Glu, E |
| glutamine | Gln, Q | glycine | Gly, G |
| histidine | His, H | isoleucine | Ile, I |
| leucine | Leu, L | lysine | Lys, K |
| methionine | Met, M | phenylalanine | Phe, F |
| proline | Pro, P | serine | Ser, S |
| threonine | Thr, T | tryptophan | Trp, W |
| tyrosine | Tyr, Y | valine | Val, V |

One aspect of the present invention provides an antibody that specifically binds to collagen triple helix repeat containing-1 (CTHRC1) protein.

As used herein, the term "CTHRC1 (collagen triple helix repeat containing—1)" is a water-soluble protein that involves in vascular remodeling, bone formation, and morphogenesis, and it is known that the protein is expressed in injured arteries and thereby promotes cell migration, and has the function of remodeling the injured aorta by inhibiting collagen synthesis in fibroblasts and smooth muscle cells. It is also known that the expression of CTHRC1 in endothelial cells regulates transforming growth factor-β (TGF-β) and thus suppresses the expression of TGF-β target genes including collagen. Additionally, CTHRC1 transgenic mice increase osteoblastic bone formation of osteoblasts, and differentiation and mineralization of osteoprogenitor cells, and also interact with Wnt5a to activate planar cell polarity pathway. Based on these, the role of CTHRC1 in the regulation of morphogenesis during development can be confirmed.

The CTHRC1 protein of the present invention may be obtained through recombination by a conventional method or may be commercially purchased. The CTHRC1 of the present invention may be in the form of an isolated protein or in a form bound to other proteins or polysaccharides, and specifically, it may be in a form bound to bacterial exotoxins, but the form is not limited thereto.

Antibodies that specifically recognize CTHRC1 protein can be used for diagnosis, prevention or treatment of diseases, such as cancer, in which CTHRC1 is overexpressed. In this regard, the present inventors have developed an antibody that binds to human and mouse CTHRC1 protein with high affinity. The antibody of the present invention binds to all of the human CTHRC1 protein with high affinity, and thus can be effectively used in the field of diagnosis of diseases in which the CTHRC1 protein is overexpressed, as well as in the field of prevention or treatment of cancer.

As used herein, the term "antibody" refers to a protein molecule that acts as a receptor capable of specifically recognizing antigens, including an immunoglobulin molecule having immunological reactivity to a particular antigen. It may include all of polyclonal antibodies, monoclonal antibodies, whole antibodies, and antibody fragments. For the purpose of the present invention, the antibody may be an antibody that specifically binds to collagen triple helix repeat containing-1 (CTHRC1) protein. Additionally, the term includes chimeric antibodies, humanized antibodies, human antibodies and bivalent or bispecific molecules (e.g., bispecific antibodies), diabodies, triabodies, and tetrabodies. Additionally, the term further includes a single-chain antibody having a binding function to neonatal Fc receptors (FcRn), scabs (single-chain antibodys), derivatives of an antibody constant region, and artificial antibodies based on a protein scaffold. The whole antibody has a structure with two full-length light chains and two full-length heavy chains, in which each light chain is linked to a heavy chain by a disulfide bond. The whole antibody includes IgA, IgD, IgE, IgM, and IgG, in which IgG includes IgG1, IgG2, IgG3, and IgG4 as subtypes. The antibody fragment refers to a fragment having an antigen-binding function and includes Fd, Fab, Fab', F(ab")$_2$, Fv, etc. The Fd refers to the heavy chain portion included in the Fab fragment. The Fab has a structure composed of variable regions of the light and heavy chains, a constant region of the light chain, and the first constant region of the heavy chain (CH1 domain), and has one antigen-binding site. The Fab' differs from Fab in that it has a hinge region including at least one cysteine residue at the C-terminus of the heavy chain CH1 domain. The F(ab")$_2$ antibody is produced as the cysteine residue in the hinge region of the Fab' forms a disulfide bond. The variable fragment (Fv) refers to a minimum antibody fragment having only a heavy chain variable region and a light chain variable chain. The disulfide-stabilized Fv (dsFv) antibody fragment is characterized in that the heavy chain variable region and the light chain variable region are linked by a disulfide bond, whereas the single-chain Fv (scFv) is generally characterized in that the heavy chain variable region and the light chain variable region are linked by a covalent bond through a peptide linker. These antibody fragments can be obtained using a protease (e.g., Fab can be obtained by restriction digestion of whole antibodies with papain, and F(ab")$_2$ fragment can be obtained by digestion of whole antibodies with pepsin). Preferably, the antibody fragments may be constructed through genetic recombination technology.

As used herein, the term "monoclonal antibody" refers to antibody molecules having a single molecular composition, obtained from a population of essentially identical antibodies. Such monoclonal antibodies show a single binding specificity and affinity for a specific epitope.

Generally, an immunoglobulin has a heavy chain and a light chain, and each of the heavy chain and the light chain includes a constant region and a variable region (these regions are also known as "domains"). The variable regions of the light chain and the heavy chain include three hypervariable regions called complementarity-determining regions (hereinafter, "CDR") and four framework regions. The CDRs are primarily responsible for binding to an epitope of an antigen. The CDRs of each chain are typically referred to as CDR1, CDR2, and CDR3, numbered sequentially starting from the N-terminus, and are also identified by the chain in which the particular CDR is located.

As used herein, the term "human antibody" refers to a molecule derived from human immunoglobulin, in which the full-length amino acid sequence of the antibody, including complementarity-determining regions and framework regions, consists of the amino acid sequence of human immunoglobulin. Human antibodies are generally used for the treatment of human diseases and may have three or more potent advantages. First, the human antibody can more easily interact with the human immune system so that target cells can be more efficiently lysed by, for example, complement-dependent cytotoxicity (CDC) or antibody-dependent cell-mediated cytotoxicity (ADCC). Second, there is an advantage in that the human immune system does not recognize the antibody as a foreign antibody. Third, there is an advantage in that, even when a drug is administered in a smaller amount at a lower frequency, the half-life thereof in the human circulatory system is similar to that of a naturally-occurring antibody.

Additionally, when the antibody of the present invention includes a constant region, it may include a constant region derived from IgG, IgA, IgD, IgE, IgM, or combinations or hybrids thereof.

As used herein, the term "combination" means that polypeptides encoding single-chain immunoglobulin constant regions of the same origin are linked to a single-chain polypeptide of a different origin to form a dimer or a multimer. For example, a dimer or a multimer may be formed from two or more constant regions selected from the group consisting of IgG, IgA, IgD, IgE, and IgM constant regions.

As used herein, the term "hybrid" means that sequences corresponding to two or more immunoglobulin heavy chain constant regions of different origins are present in a single-chain of an immunoglobulin heavy chain constant region. For example, possible hybrid domains may be composed of one to four domains selected from the group consisting of CH1, CH2, CH3, and CH4 of IgG, IgA, IgD, IgE, and IgM.

As used herein, the term "antibody that specifically binds to collagen triple helix repeat containing-1 (CTHRC1) protein" refers to an antibody capable of inhibiting the activity of CTHRC1 protein by binding to CTHRC1 protein.

The antibody that specifically binds to CTHRC1 of the present invention is characterized in that it binds to human CTHRC1 protein with high affinity.

The antibody may include (a) a heavy chain variable region including a heavy chain CDR1 of SEQ ID NO: 1 or 11, a heavy chain CDR2 of SEQ ID NO: 2 or 12, and a heavy chain CDR3 of SEQ ID NO: 3 or 13; and (b) a light chain variable region including a light chain CDR1 of SEQ ID NO: 4 or 14, a light chain CDR2 of SEQ ID NO: 5 or 15, and a light chain CDR3 of SEQ ID NO: 6 or 16.

Additionally, the antibody of the present invention may include a heavy chain variable region consisting of an amino acid sequence of SEQ ID NO: 7, 17, 21, or 25; and a light chain variable region consisting of an amino acid sequence of SEQ ID NO: 9, 19, 23, or 27.

In one example of the present invention, the antibody of the present invention with improved affinity and specificity for CTHRC1 protein may specifically include, but are not limited to, a heavy chain variable region including a heavy chain CDR1 of SEQ ID NO: 1, a heavy chain CDR2 of SEQ ID NO: 2, and a heavy chain CDR3 of SEQ ID NO: 3; and a light chain variable region including a light chain CDR1 of SEQ ID NO: 4, a light chain CDR2 of SEQ ID NO: 5, and a light chain CDR3 of SEQ ID NO: 6; or a heavy chain variable region including a heavy chain CDR1 of SEQ ID NO: 11, a heavy chain CDR2 of SEQ ID NO: 12, and a heavy chain CDR3 of SEQ ID NO: 13; and a light chain variable region including a light chain CDR1 of SEQ ID NO: 14, a light chain CDR2 of SEQ ID NO: 15, and a light chain CDR3 of SEQ ID NO: 16, but is not limited thereto.

In one embodiment of the present invention, the antibody including a heavy chain variable region consisting of the amino acid sequence of SEQ ID NO: 7 and a light chain variable region consisting of the amino acid sequence of SEQ ID NO: 9 was named "4H5" or "cCMAb45", and the antibody including a heavy chain variable region consisting of the amino acid sequence of SEQ ID NO: 17 and a light chain variable region consisting of the amino acid sequence of SEQ ID NO: 19 was named "9E6" or "cCMAb96".

Additionally, the antibody including a heavy chain variable region consisting of the amino acid sequence of SEQ ID NO: 21 and a light chain variable region consisting of the amino acid sequence of SEQ ID NO: 23 was named "4H5" or "hCMAb45", and the antibody including a heavy chain variable region consisting of the amino acid sequence of SEQ ID NO: 25 and a light chain variable region consisting of the amino acid sequence of SEQ ID NO: 27 was named "9E6" or "hCMAb96".

In one embodiment of the present invention, four novel 4H5, 9E6, 6C1, and 1D1 antibodies with the highest affinity to antigen were selected by screening B lymphocytes that bind to CTHRC1 protein, and as a result of confirming the epitopes of 4H5 and 9E6 among the four antibodies, it was confirmed that 4H5 and 9E6 specifically bind to the CTHRC1 protein with high affinity, thereby providing the above two novel antibodies.

These results suggest that the antibody binding to the CTHRC1 protein of the present invention can be effectively used in the field requiring recognition of CTHRC1 protein, for example, in the diagnosis or treatment of diseases in which CTHRC1 protein is overexpressed.

Another aspect of the present invention provides a method for preparing the antibody.

The antibody of the present invention can be easily prepared by conventional antibody production technology. For example, the method for preparing monoclonal antibodies may be performed by producing a hybridoma using B lymphocytes obtained from immunized animals (Koeher and Milstein, 1976, Nature, 256:495) or may be performed using the phage display technology, but is not limited thereto. The method for preparing polyclonal antibodies can be easily prepared using conventional antibody production technology.

An antibody library using the phage display technology is a method of expressing an antibody on the surface of a phage with genes of the antibody directly obtained from B lymphocytes without preparation of hybridoma. Many of the difficulties associated with generating monoclonal antibodies by B-cell immortalization can be overcome by the phage display technology. The conventional phage display includes the steps of: 1) inserting an oligonucleotide having a random sequence into the region corresponding to the N-terminus of a phage coat protein pill (or ply); 2) expressing a fusion protein consisting of a part of a natural coat protein and a polypeptide encoded by the above oligonucleotide having a random sequence; 3) treating a material that can bind to the polypeptide coded by the oligonucleotide; 4) eluting peptide-phage particles bound to the above material at a low pH or using a molecule which has binding competitiveness; 5) amplifying the eluted phage in a host cell by panning; 6) repeating the above steps to obtain desired amounts of phage; and 7) determining the sequence of an active antibody from the DNA sequences of the phage clones selected by panning.

The method for preparing the monoclonal antibody of the present invention may be performed by the phage display technology. A person skilled in the art to which the present invention pertains can easily perform the above steps with reference to well-known phage display techniques, which are disclosed in, for example, Barbas et al. (*METHODS: A Companion to Methods in Enzymology* 2:119, 1991 *J. Virol.* 2001 July; 75(14):6692-9) and Winter et al. (*Ann. Rev. Immunol.* 12:433, 1994). Examples of a phage which can be used for constructing an antibody library include, but are not limited to, filamentous phages, such as fd, M13, fl, If1, Ike, Zj/Z, Ff, Xf, Pf1, and Pf3. Also, examples of a vector which can be used for the expression of a heterogeneous gene on the surface of the filamentous phage include, but are not limited to, phage vectors, such as fUSE5, fAFF1, fd-CAT1, or fdtetDOG, or phagemid vectors, such as pHEN1, pComb3, pComb8, or pSEX. Further, examples of a helper phage, which can be used to provide a natural coat protein required for successful re-infection of recombinant phage, include, but are not limited to, M13K07 or VSCM13.

A polynucleotide encoding the monoclonal antibody clone of the present invention can be readily isolated and sequenced using conventional procedures, e.g., by using oligonucleotide primers designed to specifically amplify the heavy chain and light chain regions of interest from a phage template DNA. Once the polynucleotide is isolated, it can be placed into an expression vector, which is then introduced into suitable host cells, and the desired monoclonal antibody can be prepared from the transformed host cells (i.e., transformants). Thus, the method for preparing the human monoclonal antibody may include a step of amplifying a polynucleotide encoding the human monoclonal antibody in an expression vector including a polynucleotide encoding the human monoclonal antibody, but is not limited thereto.

Still another aspect of the present invention provides a polynucleotide encoding the antibody, an expression vector including the polynucleotide, and a host cell introduced with the expression vector.

The antibody is as described above.

An expression vector including a polynucleotide encoding the antibody according to the present invention is not specifically limited, but may be a vector capable of replicating and/or expressing the polynucleotide in eukaryotic or prokaryotic cells, including mammalian cells (e.g., human, monkey, rabbit, rat, hamster or mouse cells), plant cells, yeast cells, insect cells and bacterial cells (e.g., $E.$ $coli$). Preferably, it may be a vector, which includes at least one selective marker and is operably linked to a suitable promoter so that the nucleotide can be expressed in a host cell. For example, the vector may be in a form in which the polynucleotide is introduced into a phage, plasmid, cosmid, mini-chromosome, virus or retrovirus vector, etc.

The expression vector including the polynucleotide encoding the antibody may be an expression vector including each of the polynucleotides encoding the heavy chain or light chain of the antibody or an expression vector including all of the polynucleotides encoding the heavy chain or light chain of the antibody.

The host cell into which the expression vector is introduced may be, but is not particularly limited to, transformants introduced with the expression vector, e.g., bacterial cells such as $E.$ $coli,$ $Streptomyces,$ $Salmonella$ $typhimurium,$ etc.; yeast cells; fungal cells such as $Pichia$ $pastoris,$ etc.; insect cells such as $Drosophila,$ $Spodoptera$ Sf9 cells, etc.; animal cells such as Chinese hamster ovary (CHO) cells, SP2/0 (mouse myeloma), human lymphoblastoid, COS (monkey kidney fibroblasts), NSO (mouse myeloma), 293T, Bowes melanoma cells, HT-1080, BHK (baby hamster kidney cells), HEK (human embryonic kidney cells), PERC.6 (human retinal cells), etc.; and plant cells.

As used herein, the term "introduction" refers to the delivery of the vector including the polynucleotide encoding the antibody into a host cell. Such introduction may be performed by various methods known in the art, such as, calcium phosphate—DNA co-precipitation, DEAE—dextran-mediated transfection, polybrene-mediated transfection, electroporation, microinjection, liposome-mediated transfection, liposome fusion, lipofection and protoplast fusion. Also, transfection means delivering a desired material into a cell by means of infection using viral particles. In addition, the vector may be introduced into a host cell by gene bombardment, etc. In the present invention, the introduction may be used interchangeably with transfection.

Yet another aspect of the present invention provides a pharmaceutical composition for preventing or treating cancer, including the antibody.

The antibody binds with high affinity to CTHRC1 protein, which is overexpressed in cancer and known to play an important role in the growth and metastasis of cancer cells, leading to the inhibition, neutralization, and/or cytotoxic reaction of the CTHRC1 protein, and thereby result in the prevention or treatment of a disease in which the CTHRC1 protein is overexpressed. The antibody is as described above.

As used herein, the term "cancer" refers to any kind of cancer that can be prevented or treated by the antibody of the present invention without limitation. Examples thereof may include, but are not limited to, pancreatic cancer, ovarian cancer, breast cancer, melanoma, liver cancer, cervical cancer, gastric cancer, lung cancer, colorectal cancer, oral cancer and bladder cancer. As used herein, the term "prevention" refers to all actions that inhibit or delay the development of cancer by administering the composition, and the term "treatment" refers to all actions that restore or beneficially change the symptoms of cancer by administering the composition.

The pharmaceutical composition may further include a pharmaceutically acceptable carrier.

As used herein, the term "pharmaceutically acceptable carrier" refers to a carrier or diluent that does not cause irritation to an organism and does not abrogate the biological activity and properties of the administered compound. Examples of the pharmaceutically acceptable carrier, which can be used to formulate the composition in the form of liquid solutions, include saline solution, sterile water, Ringer's solution, buffered saline solution, albumin injection solution, dextrose solution, maltodextrin solution, glycerol, ethanol, and a mixture of one or more thereof. If necessary, the composition may also contain other conventional additives, such as antioxidants, buffers, bacteriostatic agents, etc. Moreover, the composition may additionally contain diluents, dispersants, surfactants, binders and lubricants in order to formulate the composition into injectable formulations, such as aqueous solutions, suspensions, emulsions, etc., pills, capsules, granules or tablets.

The pharmaceutical composition may be in the form of various oral or parenteral formulations. The pharmaceutical composition is formulated using conventional diluents or excipients, including fillers, extenders, binders, wetting agents, disintegrants, surfactants, etc. Solid formulations for oral administration include tablets, pills, powders, granules, capsules, etc. These solid formulations may be prepared by mixing at least one compound with one or more excipients, for example, starch, calcium carbonate, sucrose, lactose, gelatin, etc. In addition to simple excipients, lubricants such as magnesium stearate, talc, etc. may also be used. Additionally, liquid formulations for oral administration include a suspension, a solution for internal use, an emulsion and a syrup, etc. In addition to water, commonly used as a simple diluent, and liquid paraffin, various excipients, for example, wetting agents, sweetening agents, flavors, preservatives, etc. may be included. Formulations for parenteral administration include sterilized aqueous solutions, non-aqueous solvents, suspending agents, emulsions, freeze-drying agents, suppositories, etc. Propylene glycol, polyethylene glycol, vegetable oils such as olive oil, injectable esters such as ethyl oleate, etc. may be used as non-aqueous solvents and suspending agents. Bases for suppositories may include witepsol, macrogol, tween 61, cacao butter, laurin butter, glycerinated gelatin, etc.

The pharmaceutical composition may have any one formulation selected from the group consisting of a tablet, a pill, powder, a granule, a capsule, a suspension, a solution for internal use, an emulsion, a syrup, a sterilized aqueous solution, a non-aqueous solution, a freeze-drying agent and a suppository.

The composition of the present invention may be administered in a pharmaceutically effective amount.

As used herein, the term "pharmaceutically effective amount" refers to an amount sufficient to treat diseases, at a reasonable benefit/risk ratio applicable to any medical treatment. The effective dosage level of the composition may be determined depending on the subject's type, the disease severity, the subject's age and sex, the type of cancer, the activity of the drug, sensitivity to the drug, the time of administration, the route of administration, excretion rate, the duration of treatment, factors including drugs used in combination with the composition, and other factors known in the medical field. The composition of the present invention may be administered alone or in combination with other therapeutic agents, and may be administered sequentially or simultaneously with conventional therapeutic agents. Additionally, the composition can be administered in a single or multiple dosage form. It is important to administer the composition in the minimum amount that can exhibit the maximum effect without causing side effects, in view of all the above-described factors, and the minimum amount can be easily determined by those skilled in the art.

Even another aspect of the present invention provides a method for treating cancer using the antibody.

The antibody and cancer are as described as above.

The method for treating cancer may be a method for treating cancer including a step of administering a pharmaceutical composition including the antibody together with a pharmaceutically acceptable carrier to a subject having cancer or suspected of having cancer. Herein, the pharmaceutically acceptable carrier is as described above. The method for treating cancer may specifically be a method for treating cancer including a step of administering a composition including the antibody to a subject having cancer.

Examples of the subject include mammals, including cattle, pigs, sheep, chickens, dogs, humans, etc. and birds. The subject may be any subject in which cancer is to be treated by administration of the composition of the present invention.

In particular, the composition may be administered in a pharmaceutically effective amount in a single or multiple dosage form. Herein, the composition may be administered in the form of liquid, powder, aerosol, capsule, enteric coated tablet or capsule, or suppository. In addition, the composition may be administered intraperitoneally, intravenously, intramuscularly, subcutaneously, intradermally, orally, topically, intranasally, intrapulmonarily, or intrarectally, but is not limited thereto. However, when the composition is administered orally, the peptide is digested in the stomach, and for this reason, the oral composition should be formulated so that the active ingredient is coated or protected from decomposition in the stomach. In addition, the pharmaceutical composition may be administered using any device capable of delivering the active ingredient to a target cell.

Further another aspect of the present invention provides a method of providing information for diagnosing cancer, including detecting CTHRC1 protein in a biological sample isolated from a subject suspected of having cancer through an antigen-antibody reaction, using the antibody. Additionally, the method may be a method for diagnosing cancer.

Still further another aspect of the present invention provides a method of providing information for predicting prognosis of cancer, including detecting CTHRC1 protein in a biological sample isolated from a subject suffering from cancer through an antigen-antibody reaction, using the antibody. In addition, the method may be a method for predicting prognosis of cancer. The antibody, cancer, subject and CTHRC1 protein are as described above. Since the CTHRC1 protein is known to be overexpressed in various cancers, the antibody of the present invention can be effectively used for diagnosis of cancers in which the CTHRC1 protein is known to be overexpressed. In addition, it has also been reported that the overexpression of CTHRC1 protein induces the epithelial-mesenchymal transition (EMT) related to metastasis and is thus associated with poor prognosis of cancer. Therefore, the antibody according to the present invention can be effectively used for predicting the prognosis of cancer.

The method of providing information for diagnosing cancer or predicting prognosis of cancer enables the detection of CTHRC1 protein by reacting the human monoclonal antibody specific for CTHRC1 of the present invention with a biological sample isolated from a subject suspected of having cancer or suffering from cancer and detecting the formation of an antigen-antibody complex, thereby providing the information for diagnosing cancer or predicting the prognosis of cancer.

Specifically, the method may be a method of providing information for diagnosis of cancer or a method for diagnosing cancer, including the steps of: (a) treating a biological sample isolated from a subject suspected of having cancer with the antibody, to detect CTHRC1 protein by an antigen-antibody reaction; and (b) comparing the level of the CTHRC1 protein detected in step (a) with that in a control group, and judging the subject as a cancer patient if the level of the CTHRC1 protein in the biological sample is higher than that in the control group.

Specifically, the method may be a method of providing information for predicting prognosis of cancer or a method for predicting prognosis of cancer, including the steps of: (a) treating a biological sample isolated from a subject suffering from cancer with the antibody, to detect CTHRC1 protein by an antigen-antibody reaction; and (b) comparing the level of the CTHRC1 protein detected in step (a) with that in a control group.

As used herein, the term "biological sample" is meant to include tissues, cells, whole blood, serum, plasma, tissue autopsy samples (brain, skin, lymph node, spinal cord, etc.), cell culture supernatant, ruptured eukaryotic cells, and bacterial expression systems, etc., but is not limited thereto. These biological samples can be reacted with the antibody in a manipulated or non-manipulated state in order to determine the presence of CTHRC1 protein or the presence or absence of cancer.

As used herein, the term "antigen-antibody complex" refers to a conjugate between the CTHRC1 protein antigen in a sample and the monoclonal antibody of the present invention recognizing the CTHRC1 protein antigen. The formation of such an antigen-antibody complex can be detected by any method selected from the group consisting of a colorimetric method, an electrochemical method, a fluorimetric method, luminometry, a particle counting method, visual assessment, and a scintillation counting method, but the method is not limited thereto, and various methods may be used.

In the present invention, various labels may be used to detect the antigen-antibody complex. Specific examples of the label include, but are not limited to, enzymes, fluorescent materials, ligands, luminescent materials, microparticles, and radioactive isotopes.

Examples of the enzyme used as the detection label include acetyl-cholinesterase, alkaline phosphatase, βD-galactosidase, horseradish peroxidase, β-lactamase, etc. Examples of the fluorescent material include fluorescein, $Eu^{3+}$, $Eu^{3+}$ chelates, cryptate, etc. Examples of the ligand include biotin derivatives, etc., and examples of the luminescent material include acridinium ester, isoluminol derivatives, etc. In addition, examples of the microparticles include colloidal gold, colored latex, etc., and examples of the radioactive isotope includes $^{57}Co$, $^{3}H$, $^{125}I$, and $^{125}I$-Bonton Hunter reagents, etc.

Preferably, the antigen-antibody complex may be detected by an enzyme linked immunosorbent assay (ELISA). Examples of the ELISA include various ELISA, such as direct ELISA using a labeled antibody recognizing an antigen attached to a solid support, indirect ELISA using a labeled secondary antibody recognizing a capture antibody in an antibody complex that recognizes an antigen attached to a solid support, direct sandwich ELISA using another labeled antibody recognizing an antigen in an antigen-antibody complex attached to a solid support, indirect sandwich ELISA which involves reacting an antigen with another antibody in an antigen-antibody complex attached to a solid support and using a labeled secondary antibody recognizing another antibody, and competitive ELISA which involves competition between different antigens with the same antibody binding site, etc.

The monoclonal antibody may have a detection label. If the monoclonal antibody has no detection label, it can be captured and detected by treatment with another antibody having a detection label.

Still further another aspect of the present invention provides a composition for diagnosing cancer or predicting prognosis of cancer.

The antibody and cancer are the same as described above. It is possible to diagnose diseases related to the expression or level of expression of CTHRC1 protein, such as cancer, or predict the prognosis of cancer, by using the composition for diagnosing cancer or predicting prognosis of cancer, including the antibody specific for CTHRC1 protein of the present invention.

Still further another aspect of the present invention provides a kit for diagnosing cancer or predicting prognosis of cancer, including the composition for diagnosing cancer or predicting prognosis of cancer.

The composition and cancer are the same as described above. In addition, the kit for diagnosing cancer may further include a composition, solution or device having one or more other components suitable for assay methods.

Still further another aspect of the present invention provides a composition and a kit for detecting CTHRC1 protein, including the antibody that specifically binds to collagen triple helix repeat containing-1 (CTHRC1) protein.

Still further another aspect of the present invention provides a method for detecting CTHRC1 protein in a sample, including detecting an CTHRC1 antigen-antibody complex using the antibody that specifically binds to CTHRC1. The detection method may be used for quantification of conjugate vaccines.

As used herein, the term "antigen-antibody complex" refers to a conjugate between the relevant antigen in a sample and an antibody recognizing the antigen. The detection of the antigen-antibody complex can be carried out using any of methods well-known in the art, for example, spectroscopic, photochemical, biochemical, immunochemical, electrical, absorption spectrometric, chemical, and other methods. Specifically, it may be detected by any method selected from the group consisting of a colorimetric method, an electrochemical method, a fluorimetric method, luminometry, a particle counting method, visual assessment, and a scintillation counting method, and methods of Western blot, ELISA, radioimmunoassay, radioimmunodiffusion, Ouchterlony immunodiffusion method, rocket immunoelectrophoresis, tissue immunostaining, immunoprecipitation assay, complement fixation assay, flow cytometry (FACS), protein chip, etc., but the method is not limited thereto.

In the present invention, various labels may be used to detect the antigen-antibody complex. Specific examples of the label include, but are not limited to, enzymes, fluorescent materials, ligands, luminescent materials, microparticles, and radioactive isotopes.

Examples of the enzyme used as the detection label include acetyl-cholinesterase, alkaline phosphatase, βD-galactosidase, horseradish peroxidase, β-lactamase, etc. Examples of the fluorescent material include fluorescein, $Eu^{3+}$, $Eu^{3+}$ chelates, cryptate, etc. Examples of the ligand include biotin derivatives, etc., and examples of the luminescent material include acridinium ester, isoluminol derivatives, etc. In addition, examples of the microparticles include colloidal gold, colored latex, etc., and examples of the radioactive isotope includes $^{57}Co$, $^{3}H$, $^{125}I$, and $^{125}I$-Bonton Hunter reagents, etc. These materials are not limited thereto.

The kit of the present invention may be in the form of enzyme-linked immunosorbent assay (ELISA) kit. Specifically, the kit may include the above-described antibody as a capture antibody, and the ELISA may include (i) a polyclonal antibody that binds to CTHRC1; (ii) a capture antibody in the form of the antibody that specifically binds to collagen triple helix repeat containing-1 (CTHRC1) protein; and (iii) an antibody bound to a detection-labeled IgG Fc, but is not limited thereto.

As used herein, the term "enzyme-linked immunosorbent assay (ELISA)" is also referred to as an enzyme immunoassay method, and is a method for quantification using absorbance by binding an enzyme to an antibody to form an antigen-antibody complex through the reaction of the enzyme with a substrate. Examples of the ELISA include various ELISA, such as direct ELISA using a labeled antibody recognizing an antigen attached to a solid support, indirect ELISA using a labeled secondary antibody recognizing a capture antibody in an antibody complex that recognizes an antigen attached to a solid support, direct sandwich ELISA using another labeled antibody recognizing an antigen in an antigen-antibody complex attached to a solid support, indirect sandwich ELISA which involves reacting an antigen with another antibody in an antigen-antibody complex attached to a solid support and using a labeled secondary antibody recognizing another antibody, and competitive ELISA which involves competition between different antigens with the same antibody binding site, etc.

A very trace amount of CTHRC1 protein can be detected using the antibody that specifically binds to the CTHRC1 protein of the present invention; a composition for detection including the same; a kit; and a method for detecting CTHRC1 protein using the same. The amount of the protein to be detected may be specifically less than 1 mg, less than 100 µg, and more specifically less than 10 µg, less than 1 µg, less than 100 ng, less than 10 ng, and less than 1 ng.

In one embodiment of the present invention, it was confirmed that several ng levels of CTHRC1 protein can be detected by performing indirect ELISA using 4H5 and 9E6 antibodies that specifically bind to CTHRC1 as capture antibodies, and that conjugate vaccines can also be detected through ELISA.

As described above, a much smaller amount of CTHRC1 protein can be detected by using the antibody of the present invention, as compared to the conventional kit for detecting CTHRC1 protein. Accordingly, the antibody of the present invention can be effectively used for quantification of CTHRC1 protein and vaccines using the same.

MODE FOR CARRYING OUT THE INVENTION

Hereinafter, the present invention will be described in more detail by way of Examples and Experimental Examples. However, these Examples and Experimental Examples are given for illustrative purposes only, and the scope of the invention is not intended to be limited to or by these Examples and Experimental Examples.

Example 1: Mouse Antibodies cCMAb45 and cCMAb96

Example 1-1: Discovery of 4H5 and 9E6

In order to develop an antibody targeting a CTHRC1 protein, a mouse monoclonal antibody that binds to the CTHRC1 protein was discovered. Specifically, once an antibody for the CTHRC1 protein was produced by injecting the CTHRC1 protein into a mouse, B lymphocytes were isolated from the spleen of the mouse. The isolated lymphocytes were diluted so that only one B lymphocyte was allowed to enter each well of a 96-well plate coated with the CTHRC1 protein. Then, the B lymphocytes binding to the CTHRC1 protein were screened using horseradish peroxidase (HRP)-labeled anti-mouse antibodies.

As a result, four kinds of anti-CTHRC1 mouse monoclonal antibodies (4H5, 9E6, 6C1, and 1 D1) were discovered.

Example 1-2: Confirmation of Affinity to CTHRC1

Indirect ELISA was performed in order to identify the antibody with the highest affinity for the CTHRC1 protein among the four kinds of anti-CTHRC1 mouse monoclonal antibodies discovered in Example 1-1.

An immuno-plate coated with CTHRC1-Fc and CTHRC1-His was treated with the four kinds of antibodies (4H5, 9E6, 6C1, and 1 D1) at different concentrations and reacted for 2 hours, and the OD (optical density) values were measured using the HRP-labeled anti-mouse antibodies as a secondary antibody. In particular, the higher OD value indicates that the antibodies bind to CTHRC1 with higher affinity.

As a result, it was confirmed that although the OD values of all four antibodies increased according to the concentration of CTHRC1 protein, the two kinds of antibodies (4H5 and 9E6) bind to the CTHRC1 protein with higher affinity compared to the other antibodies (FIG. 1)

Example 1-3: Confirmation of Epitopes

In order to confirm the epitopes of 4H5 and 9E6 with high affinity among the four kinds of the anti-CTHRC1 mouse antibodies, competitive ELISA was performed. In particular, the epitope refers to the location of the antigen recognized by the antibody.

An immuno-plate was coated with the CTHRC1 protein, and then, biotin-labeled 4H5 and 9E6 antibodies and antibodies not labeled with biotin were added thereto at a ratio of 1:0, 1:3, 1:6, 1:12.5, 1:25, 1:50, and 1:100. The OD value of each antibody was measured using the streptavidin-HRP as a second antibody. In particular, when the two antibodies (4H5 and 9E6) have similar epitopes, the OD values decrease as the concentration of the unlabeled antibodies increases, whereas when the epitopes of the two antibodies differ from each other, the OD values do not change even when the concentration of the unlabeled antibodies increases.

As a result, it was confirmed that 4H5 and 9E6 have different epitopes from each other (FIG. 2).

Example 1-4: Preparation of Chimeric Antibodies cCMAb45 and cCMAb96

In order to minimize the immunogenicity of the 4H5 and 9E6 mouse antibodies which are specific to CTHRC1 and have high affinity, chimeric antibodies were prepared in which the variable region of mouse antibodies was retained and only the constant region thereof was replaced with constant region of human IgG. The resulting antibodies were named cCMAb45 and cCMAb96.

Example 1-5: Affinity Analysis (Indirect ELISA)

The affinity of cCMAb45 and cCMAb96, which are anti-CTHRC1 chimeric antibodies, prepared in Example 1-3 to the CTHRC1 protein was verified. Indirect ELISA was performed to test the affinity of the antigens and antibodies.

100 µL of CTHRC1 was dispensed at a concentration of 5 µg/mL onto an immuno-plate and coated at 4° C. overnight. The next day, the coated CTHRC1 solution was discarded and blocked for 2 hours. Thereafter, the cCMAb45 and cCMAb96 antibodies were treated at different concentrations and reacted at room temperature for 2 hours, and the antibodies were discarded to remove the unbound antibodies, and then the plate was washed. The OD value was measured using the anti-human Fc-HRP as a second antibody that recognizes human constant regions. In particular, the higher OD value indicates higher affinity between CTHRC1 and the antibodies.

As a result, cCMAb45 showed a $K_D$ value of $5.2 \times 10^{-10}$ M, and cCMAb96 showed a $K_D$ value of $4.3 \times 10^{-10}$ M. It was confirmed that both antibodies showed a very high affinity for the CTHRC1 protein (FIG. 3).

Example 1-6: Specificity Analysis (Indirect ELISA)

Indirect ELISA was performed to confirm whether cCMAb45 and cCMAb96 specifically bind to CTHRC1. As in the affinity analysis, an immuno-plate was coated with the CTHRC1 protein and a number of non-specific antigenic proteins. The next day, the coating solution was discarded and blocked, and cCMAb45 and cCMAb96 were added thereto at concentrations of 0 μg/mL, 1 μg/mL, and 5 μg/mL and reacted for 2 hours. Thereafter, the solution containing the antibodies was discarded and washed to remove unbound antibodies. The anti-human kappa light chain-HRP was used as a secondary antibody to measure the OD values.

As a result, it was confirmed that cCMAb45 and cCMAb96 showed high specificity for CTHRC1 (FIG. 3).

Example 1-7: Confirmation of Inhibitory Effect on Migration of Cancer Cells

In order to verify the therapeutic efficacy of cCMAb45 and cCMAb96, the inhibitory effect on migration was confirmed using cell lines of pancreatic cancer, breast cancer, ovarian cancer, and bladder cancer.

Specifically, cCMAb45 and cCMAb96 were prepared at concentrations of 1 μg/mL and 5 μg/mL or 1 μg/mL and 10 μg/mL, diluted in a serum-free medium together with the cell lines, and dispensed into the upper chamber of the Transwell. A medium containing serum was placed in the lower chamber to create an environment in which cells can migrate. The number of migrated cells was measured by culturing the antibodies in each cell line for an appropriate time.

As a result, it was confirmed that the degree of migration of cancer cells was significantly reduced in the groups treated with cCMAb45 and cCMAb96 compared to the control IgG group (FIGS. 4 to 7).

Example 1-8: Confirmation of Inhibitory Effect on Invasion of Cancer Cells

In the same manner as in Examples 1 to 7, in order to verify the efficacy of cCMAb45 and cCMAb96, the inhibitory effect on invasion of cancer cells was confirmed. The experiment was performed using pancreatic cancer, a patient-derived pancreatic cancer cell line, breast cancer, ovarian cancer, and bladder cancer.

The upper chamber of the Transwell was coated with Matrigel, which can artificially mimic the extracellular matrix, and the invasion ability of the cancer cells was observed. cCMAb45 and cCMAb96 were prepared at concentrations of 1 μg/mL and 5 μg/mL or 1 μg/mL and 10 μg/mL, diluted in a serum-free medium together with the cell lines, and dispensed into the upper chamber of the Transwell. A medium containing serum was placed in the lower chamber. After culturing the antibodies for a certain period of time, the number of cells migrated by invading Matrigel was measured.

As a result, it was confirmed that the invasion ability of the cancer cells was reduced in the groups treated with cCMAb45 and cCMAb96 compared to the control IgG group (FIGS. 8 to 12).

Example 2: Humanized hCMAb45 and hCMAb96 Antibodies

Example 2-1: Construction of Humanized Antibody Library

In order to reduce the immunogenicity of cCMAb45 and cCMAb96, which are anti-CTHRC1 chimeric antibodies, humanized antibodies, in which the framework region (hereinafter referred to as "FR") holding the CDR region was replaced with that of a human, were prepared except for the CDR region, which is the most important part for antigen binding.

A humanized antibody library having various FR regions including the CDR regions of cCMAb45 and cCMAb96 was constructed using the CDR grafting technique.

Example 2-2: Selection of Humanized Antibodies and IqG Conversion

Clones specific for CTHRC1 and having high affinity were selected from the humanized antibody library constructed above. An IgG transient expression test was performed on HEK293F cells to purify each of the eight antibodies for 4H5 and 9E6, and the purity was confirmed by SDS-PAGE.

As a result, the productivity of the 4H5 humanized antibody was measured to be 15 mg/L to 67.3 mg/L, and the productivity of the 9E6 humanized antibody was measured to be 3.1 mg/L to 33.3 mg/L (FIG. 13)

Example 2-3: Analysis of Affinity of Humanized Antibodies

Indirect ELISA was performed on the eight candidate clones of 4H5 prepared in Example 2-2 for the analysis of affinity. An immuno-plate was coated with CTHRC1-His, and on the next day, the concentrations of the eight humanized candidate antibodies and cCMAb45 were diluted stepwise by ⅓ from a maximum concentration of 500 ng/mL and added to the plate. The OD values were measured using the anti-human Fc-HRP as a secondary antibody. The affinity was expressed as $K_D$ values. A low $K_D$ value indicates high affinity.

As a result, the $K_D$ value of the humanized antibody was measured to be similar or lower than that of cCMAb45.

As a result of analyzing the eight candidate clones of the 9E6 humanized antibody in the same manner as above, the $K_D$ value of the 9E6 humanized antibody was measured to be similar to or slightly higher than that of cCMAb96.

Specifically, it was confirmed that the affinity of the 4H5 humanized antibody was measured to be $0.82 \times 10^{-10}$ M to $2.5 \times 10^{-10}$ M, and the affinity of the 9E6 humanized antibody was measured to be $1.61 \times 10^{-10}$ M to $4.8 \times 10^{-10}$ M (FIG. 14).

Example 2-4: Efficacy Test of Humanized Antibodies

In order to test the efficacy of the candidate clones of the 4H5 and 9E6 humanized antibodies, a migration assay was performed using the pancreatic cancer cell line Panc-1. 5 μg/mL of each antibody and $5 \times 10^4$ cells were diluted with a serum-free medium and dispensed into the upper chamber of the Transwell. Then, a medium containing serum was placed in the lower chamber to create an environment in which cells can migrate. The number of migrated cells was measured by culturing the antibodies for 24 hours, and the efficacy of the candidate antibodies was evaluated.

As a result, it was confirmed that the degree of migration of cancer cells was significantly reduced in the groups treated with cCMAb45 and cCMAb96 compared to the control IgG (FIGS. 4 to 7)

As a result, the candidate clones of the 4H5 humanized antibody reduced the cell migration ability by 30% to 50% compared to the control IgG, and the candidate clones of the 9E6 humanized antibody reduced the cell migration ability by 30% to 40%. In conclusion, it was confirmed that all of the candidates for the 4H5 and 9E6 humanized antibodies had efficacy similar to or higher than cCMAb45 and cCMAb96 (FIG. 15).

Example 2-5: Selection of Humanized Antibodies and Re-Evaluation of Affinity and Efficacy Antibodies were selected by evaluating the candidates clones of the 4H5 and 9E6 humanized antibodies based on three criteria: affinity, efficacy, and yield. SA2759, SA2761, SA2762 and SA2765 were selected for the 4H5 humanized antibody, and SA2768, SA2769, and SA2770 were selected for the 9E6 humanized antibody.

In order to re-evaluate the affinity and efficacy of the antibodies selected based on the above criteria, indirect ELISA was used for the evaluation of affinity, and migration assay was used for the evaluation of efficacy. The experimental method is the same as described in Examples 2-3 and 2-4.

As a result, as for the affinity, it was confirmed that the $K_D$ values were measured to be similar or lower than those of cCMAb45 and cCMAb96, similar to the first measurement, and the cell migration ability was also reduced by 30% to 50%. Specifically, it was confirmed that the selected 4H5 humanized antibody had an affinity of several pM and reduced cell migration ability by 40%, and the 9E6 humanized antibody had an affinity of several tens of pM and reduced cell migration ability by 50% (FIGS. 16 and 17).

Finally, SA2765 was named hCMAb45, and SA2770 was named hCMAb96.

Example 2-6: Analysis of Specificity of hCMAb45 and hCMAb96

Indirect ELISA was performed to determine whether hCMAb45 and hCMAb96 specifically bind to CTHRC1. An immuno-plate was coated with CTHRC1-His and a number of non-specific antigens. On the next day, hCMAb45 and hCMAb96 were reacted with antigens at concentrations of 0 μg/m L, 1 μg/m L, and 5 μg/m L, and then OD values were measured using the anti-human kappa light chain-HRP as a secondary antibody.

As a result, it was confirmed that hCMAb45 and hCMAb96 specifically bind to CTHRC1 (FIG. 18).

Example 2-7: Confirmation of Epitope Sequences

Since the difference in epitopes between the two antibodies, 4H5 and 9E6, was confirmed in Example 1-3 through competitive ELISA, the epitope sequences of hCMAb45 and hCMAb96 antibodies were analyzed so as to confirm their specific epitope sequences. The analysis of the epitopes was performed to understand the exact mechanism as to which part of the antigen each of the antibodies targets and neutralizes. The analysis was performed using hCMAb45 and hCMAb96 antibodies (i.e., humanized 4H5 and 9E6 antibodies, respectively) and CTHRC1-His (SEQ ID NO: 29) as an antigen. Specifically, after confirming the sequences of each of the antibodies and antigens through mass spectrometry, reactions were performed between hCMAb45 and CTHRC1-His and between hCMAb96 and CTHRC1-His, respectively. Thereafter, the sequences of protein fragments of the reacted antigen-antibody mixed proteins, which were randomly cleaved using a protease, were analyzed to thereby confirm the sequences of the antigens bound to the antibodies.

Before analyzing these epitopes by the method above, the molecular weights of the antigen CTHRC1 and the humanized antibodies hCMAb45 and hCMAb96 were measured by mass spectrometry. Each protein was subjected to mass spectrometry under both conditions with or without treatment of disuccinimidyl suberate (DSS), which is a crosslinking reagent or crosslinker that covalently links a non-covalent bond.

As a result of mass spectrometry, it was confirmed that CTHRC1, which is known to function in the form of a trimer, is present in all of the three forms (i.e., a monomer, a dimer, and a trimer), and that the trimers having a molecular weight of about 84.479 kDa account for about 48% of the DSS treatment (FIG. 19). In addition, it was confirmed that hCMAb445 and hCMAb96 had molecular weights of 149.579 kDa and 145.660 kDa, respectively (FIG. 20).

Next, in order to confirm which form of the antigen CTHRC1 hCMAb45 and hCMAb96 bind to, the antigen and antibodies were reacted and then subjected to mass spectrometry. Since the antigen-antibody reaction is a non-covalent interaction, the binding may be released during the experiment. Therefore, DSS (i.e., a crosslinking reagent) was used to artificially link the antigen to the antibodies through a covalent bond. Specifically, 5 μL of hCMAb45 at a concentration of 0.92 μM and 5 μL of hCMAb96 at a concentration of 1.57 μM were each mixed with 5 μL of CTHRC1-His at a concentration of 17.68 μM, and 5 μL of CTHRC1-His at a concentration of 7.68 μM, and then treated with a crosslinking reagent for mass analysis.

As a result, it was confirmed that hCMAb45 and hCMAb96 could bind to all of the monomeric, dimeric, and trimeric forms of the antigen, but predominantly to the trimeric form among them (FIG. 21).

Thereafter, in order to confirm the sequences of the epitopes, each of CTHRC1-His and hCMAb45, and CTHRC1-His and hCMAb96 was mixed at the same concentration as above, and the antigen-antibody protein mixture treated with the crosslinking reagent was treated with five types of proteases: trypsin, chymotrypsin, ASP-N, elastase, and thermolysin. In particular, the protein was randomly cleaved by these proteases, but the antigen and the antibody portions covalently linked by the crosslinking reagent were not cleaved. A total of 15 protein fragments were analyzed in the mixed protein, CTHRC1/hCMAb45, whereas 14 protein fragments were analyzed in the mixed protein, CTHRC1/hCMAb96, which were both treated with five types proteases (FIG. 22).

As a result, hCMAb45 and hCMAb96, both with a conformational epitopes rather than a linear epitopes, recognized different regions of CTHRC1 (SEQ ID NO: 30). While hCMAb45 recognized the amino acids at positions 53, 57, 65, 99, 103, 105, 157, 158, and 162 of the antigen CTHRC1-His, hCMAb96 recognized the amino acids at positions 65, 67, 71, 73, 82, 86, 92, 99, and 102 of the antigen CTHRC1-His (FIG. 23).

Example 2-8: Confirmation of Inhibitory Effect on Migration of Cancer Cells

In order to verify the therapeutic efficacy of hCMAb45 and hCMAb96, the inhibitory effect on the migration of cancer cells was confirmed. Pancreatic cancer, breast cancer, ovarian cancer, bladder cancer, lung cancer, and malignant melanoma were used, and the experimental method is the same as that described in Example 1-7.

As a result, it was confirmed that the migration ability of cancer cells was significantly reduced in the groups treated with hCMAb45 and hCMAb96 compared to the control IgG (FIGS. 24 to 27).

Example 2-9: Confirmation of Inhibitory Effect on Invasion of Cancer Cells

In the same manner as in the experimental method described in Example 1-8, the inhibitory effect on the invasion of cancer cells of hCMAb45 and hCMAb96 was confirmed.

As a result, the invasion ability of cancer cells was significantly reduced in the groups treated with hCMAb45 and hCMAb96 compared to the control IgG (FIGS. 28 to 31).

Example 2-10: Confirmation of In Vivo Anticancer Effect in Pancreatic Cancer Animal Model The inhibitory ability of the hCMAb45 and hCMAb96 humanized antibodies that specifically bind to CTHRC1 protein on cancer cell migration and invasion was confirmed in vitro through Examples 2-8 and 2-9. Accordingly, it was confirmed whether the anticancer effect was identically observed in vivo. Specifically, a subcutaneous xenograft mouse model was prepared using the pancreatic cancer cell line BxPC-3 overexpressing CTHRC1. $1 \times 10^6$ cells were transplanted subcutaneously in the right leg of the mice, and after 6 days, mice developed with tumors with a size of 73 mm$^3$ to 77 mm$^3$ were selected and divided into groups. The drug was injected into the tail vein, and the control IgG and the hCMAb45 and hCMAb96 experimental groups were administered at a dose of 10 mg/kg twice a week for a total of 4 weeks, and the size of the tumor was measured twice a week using a caliper. After treatment of the antibodies, and the experiment was terminated on day 28 (treatment 8), and the tumor size was compared relative to the tumor size of the control IgG.

As a result, it was confirmed that the size of the tumor in the groups administered with hCMAb45 and hCMAb96 was reduced compared to the group administered with the control IgG (FIG. 32). In particular, it was confirmed that the group treated with hCMAb96 had superior anticancer effect than the group treated with hCMAb45.

Through the above Examples, the in vivo anticancer effects of the hCMAb45 and hCMAb96 humanized antibodies that specifically bind to CTHRC1 were confirmed, and their potential as substances delaying or inhibiting tumor growth was verified.

From the foregoing, a skilled person in the art to which the present invention pertains will be able to understand that the present invention may be embodied in other specific forms without modifying the technical concepts or essential characteristics of the present invention. In this regard, the exemplary embodiments disclosed herein are only for illustrative purposes and should not be construed as limiting the scope of the present invention. The scope of the present invention is therefore indicated by the appended claims rather than by the foregoing description. All changes which come within the meaning and range of equivalency of the claims are to be embraced within the scope of the present invention.

The invention claimed is:

1. An antibody that specifically binds to collagen triple helix repeat containing-1 (CTHRC1) protein, which comprises: (a) a heavy chain variable region comprising a heavy chain CDR1 of SEQ ID NO: 11, a heavy chain CDR2 of SEQ ID NO: 12, and a heavy chain CDR3 of SEQ ID NO: 13; and (b) a light chain variable region comprising a light chain CDR1 of SEQ ID NO: 14, a light chain CDR2 of SEQ ID NO: 15, and a light chain CDR3 of SEQ ID NO: 16.

2. The antibody of claim 1, wherein the heavy chain variable region consists of an amino acid sequence of SEQ ID NO: 17 or 25, and the light chain variable region consists of an amino acid sequence of SEQ ID NO: 19, or 27.

3. A polynucleotide encoding the antibody of claim 1.

4. An expression vector comprising the polynucleotide of claim 3.

5. A host cell comprising the expression vector of claim 4.

6. A pharmaceutical composition for preventing or treating cancer, comprising the antibody of claim 1.

7. The composition of claim 6, wherein the cancer is selected from the group consisting of pancreatic cancer, ovarian cancer, breast cancer, melanoma, liver cancer, stomach cancer, lung cancer, colorectal cancer, oral cancer, cervical cancer, and bladder cancer.

8. A method of providing information for diagnosing cancer, comprising detecting CTHRC1 protein in a biological sample isolated from a subject suspected of having cancer through an antigen-antibody reaction, using the antibody of claim 1.

9. A method of providing information for predicting prognosis of cancer, comprising detecting CTHRC1 protein in a biological sample isolated from a subject suffering from cancer through an antigen-antibody reaction, using the antibody of claim 1.

10. A composition for diagnosing cancer or predicting prognosis of cancer, comprising the antibody of claim 1.

11. A kit for diagnosing cancer or predicting prognosis of cancer, comprising the composition of claim 10.

12. A kit for detecting CTHRC1, comprising the antibody of claim 1.

13. The kit of claim 12, wherein the kit is in the form of ELISA (Enzyme-Linked Immunosorbent Assay).

14. The kit of claim 13, wherein the antibody is a capture antibody.

15. The kit of claim 13, wherein the ELISA is an indirect ELISA comprising:

(i) a polyclonal antibody that binds to CTHRC1;

(ii) a capture antibody in the form of the antibody that specifically binds to collagen triple helix repeat containing-1 (CTHRC1) protein, which comprises: (a) a heavy chain variable region comprising a heavy chain CDR1 of SEQ ID NO: 11, a heavy chain CDR2 of SEQ ID NO: 12, and a heavy chain CDR3 of SEQ ID NO: 13; and (b) a light chain variable region comprising a light chain CDR1 of SEQ ID NO: 14, a light chain CDR2 of SEQ ID NO: 15, and a light chain CDR3 of SEQ ID NO: 16; and (iii) an antibody bound to a detection-labeled IgG Fc.

16. A method for detecting CTHRC1 protein in a sample, comprising detecting an CTHRC1 antigen-antibody complex using the antibody of claim 1.

* * * * *